US012568461B2

(12) United States Patent
Ko

(10) Patent No.: US 12,568,461 B2
(45) Date of Patent: Mar. 3, 2026

(54) METHOD AND APPARATUS FOR MEASURING POSITION IN NR V2X

(71) Applicant: LG Electronics Inc., Seoul (KR)

(72) Inventor: Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 277 days.

(21) Appl. No.: 18/561,086

(22) PCT Filed: May 20, 2022

(86) PCT No.: PCT/KR2022/007263
§ 371 (c)(1),
(2) Date: Nov. 15, 2023

(87) PCT Pub. No.: WO2022/245188
PCT Pub. Date: Nov. 24, 2022

(65) Prior Publication Data
US 2024/0259986 A1 Aug. 1, 2024

Related U.S. Application Data

(60) Provisional application No. 63/191,285, filed on May 20, 2021.

(51) Int. Cl.
*H04W 64/00* (2009.01)
*H04L 5/00* (2006.01)
*H04W 56/00* (2009.01)

(52) U.S. Cl.
CPC ........... *H04W 64/00* (2013.01); *H04L 5/0051* (2013.01); *H04W 56/0015* (2013.01)

(58) Field of Classification Search
CPC .. G01S 5/0063; G01S 5/02216; G01S 5/0284; G01S 5/12; G01S 5/14;
(Continued)

(56) References Cited

U.S. PATENT DOCUMENTS

2003/0001777 A1 1/2003 Johnson
2009/0149198 A1 6/2009 Nam et al.
(Continued)

FOREIGN PATENT DOCUMENTS

JP H11-271418 A 10/1999
JP 2022-517937 A 3/2022
(Continued)

OTHER PUBLICATIONS

Office Action in Japanese Appln. No. 2023-570141, mailed on Sep. 10, 2024, 9 pages (with English translation).
(Continued)

*Primary Examiner* — Nader Bolourchi
(74) *Attorney, Agent, or Firm* — Fish & Richardson P.C.

(57) ABSTRACT
A method by which a first device performs wireless communication, and an apparatus supporting same are presented. The method may comprise the steps of: selecting a synchronization reference; and acquiring synchronism on the basis of a synchronization signal received from the synchronization reference. For example: the first device can receive a first PRS from a second device; the first device can transmit a second PRS to a third device; the first device can transmit the second PRS to the second device and the third device at a time point at which a threshold is added from a first time point at which the first PRS is received.

20 Claims, 25 Drawing Sheets

(58) Field of Classification Search
CPC ...... H04L 5/0048; H04L 5/0051; H04W 4/40;
H04W 56/0015; H04W 56/002; H04W
64/00
See application file for complete search history.

(56) References Cited

U.S. PATENT DOCUMENTS

| 2022/0116089 | A1* | 4/2022 | Khoryaev | ............. H04W 64/00 |
| 2022/0229146 | A1 | 7/2022 | Ko et al. | |
| 2022/0264559 | A1* | 8/2022 | Lee | ....................... H04L 1/1812 |

FOREIGN PATENT DOCUMENTS

| JP | 2022-551297 | A | 12/2022 |
| WO | WO 2020/146820 | A1 | 7/2020 |
| WO | 2020/251318 | A1 | 12/2020 |
| WO | WO 2021/071194 | A1 | 4/2021 |

OTHER PUBLICATIONS

Extended European Search Report in European Appln. No. 22805041.
5, mailed on Apr. 28, 2025, 9 pages.

* cited by examiner

Figure 20:
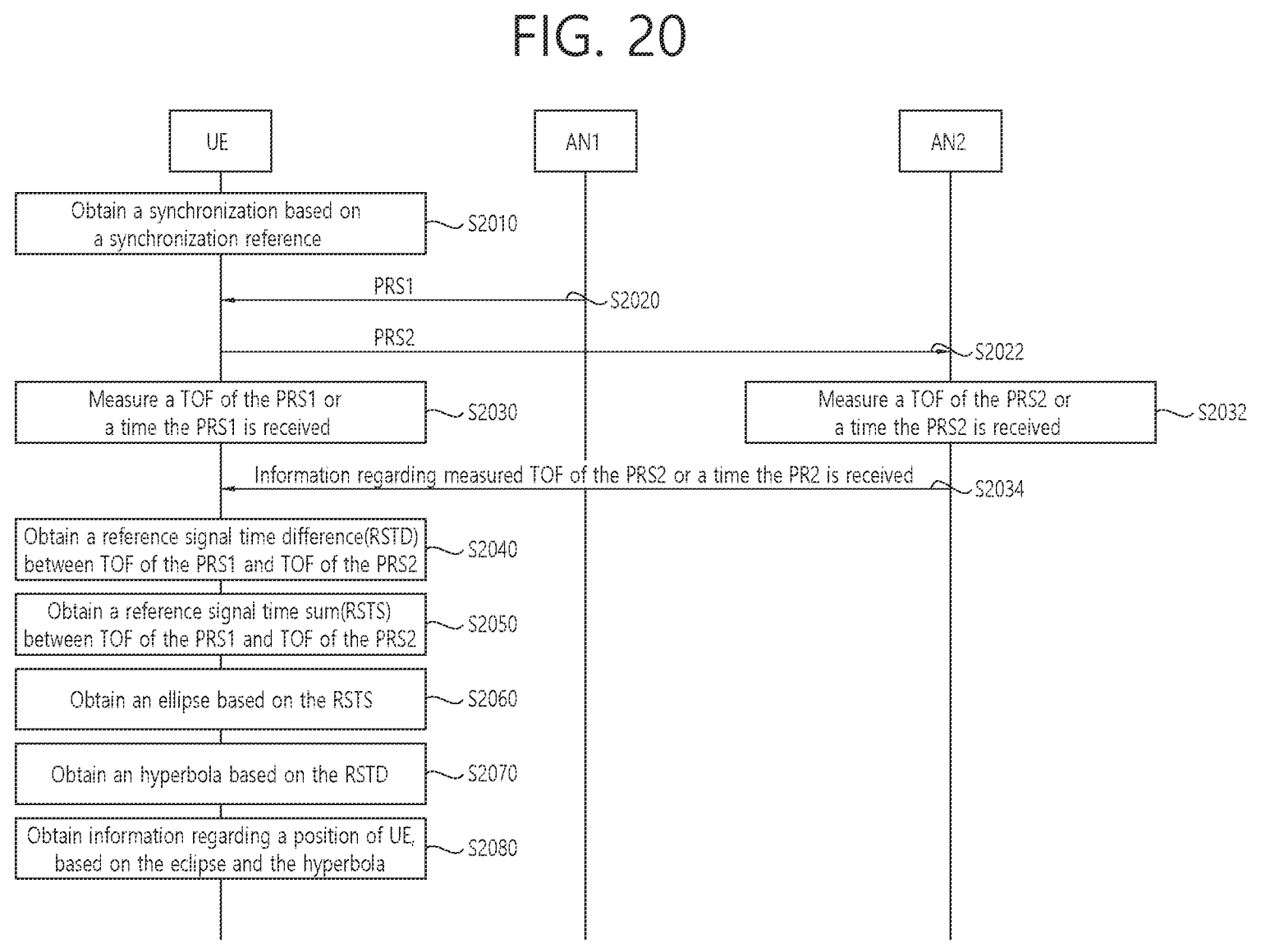

S2010 — Obtain a synchronization based on a synchronization reference

PRS1 — S2020

PRS2 — S2022

S2030 — Measure a TOF of the PRS1 or a time the PRS1 is received

S2032 — Measure a TOF of the PRS2 or a time the PRS2 is received

Information regarding measured TOF of the PRS2 or a time the PR2 is received — S2034

S2040 — Obtain a reference signal time difference(RSTD) between TOF of the PRS1 and TOF of the PRS2

S2050 — Obtain a reference signal time sum(RSTS) between TOF of the PRS1 and TOF of the PRS2

S2060 — Obtain an ellipse based on the RSTS

S2070 — Obtain an hyperbola based on the RSTD

S2080 — Obtain information regarding a position of UE, based on the ecllipse and the hyperbola

FIG. 21

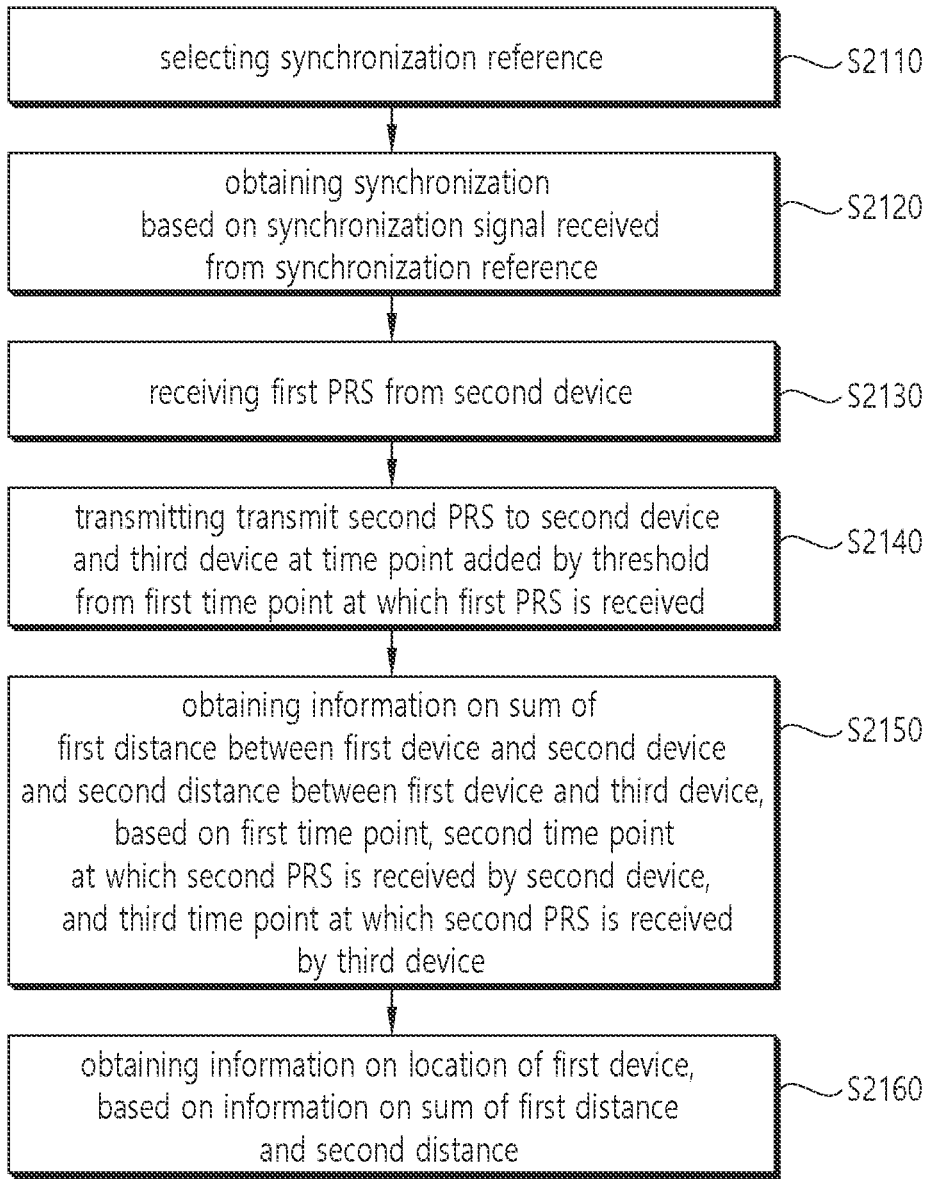

selecting synchronization reference — S2110 obtaining synchronization
based on synchronization signal received
from synchronization reference — S2120 receiving first PRS from second device — S2130 transmitting transmit second PRS to second device
and third device at time point added by threshold
from first time point at which first PRS is received — S2140 obtaining information on sum of
first distance between first device and second device
and second distance between first device and third device,
based on first time point, second time point
at which second PRS is received by second device,
and third time point at which second PRS is received
by third device — S2150 obtaining information on location of first device,
based on information on sum of first distance
and second distance — S2160

FIG. 26

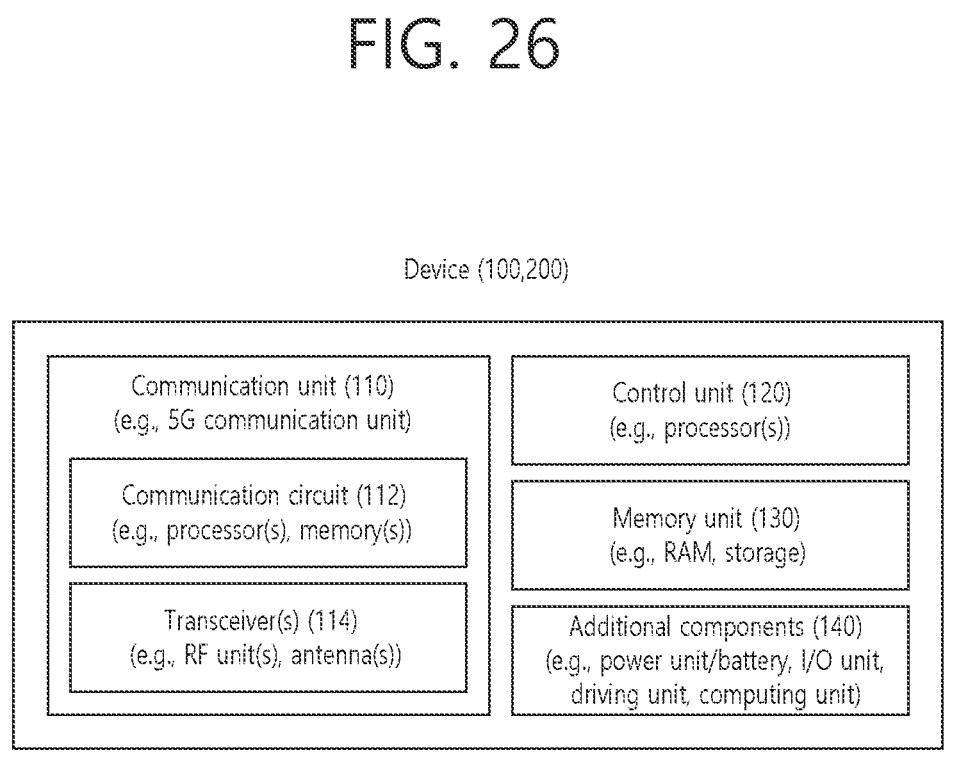

Device (100,200)

| | |
|---|---|
| Communication unit (110)<br>(e.g., 5G communication unit)<br><br>Communication circuit (112)<br>(e.g., processor(s), memory(s))<br><br>Transceiver(s) (114)<br>(e.g., RF unit(s), antenna(s)) | Control unit (120)<br>(e.g., processor(s))<br><br>Memory unit (130)<br>(e.g., RAM, storage)<br><br>Additional components (140)<br>(e.g., power unit/battery, I/O unit,<br>driving unit, computing unit) |

FIG. 28

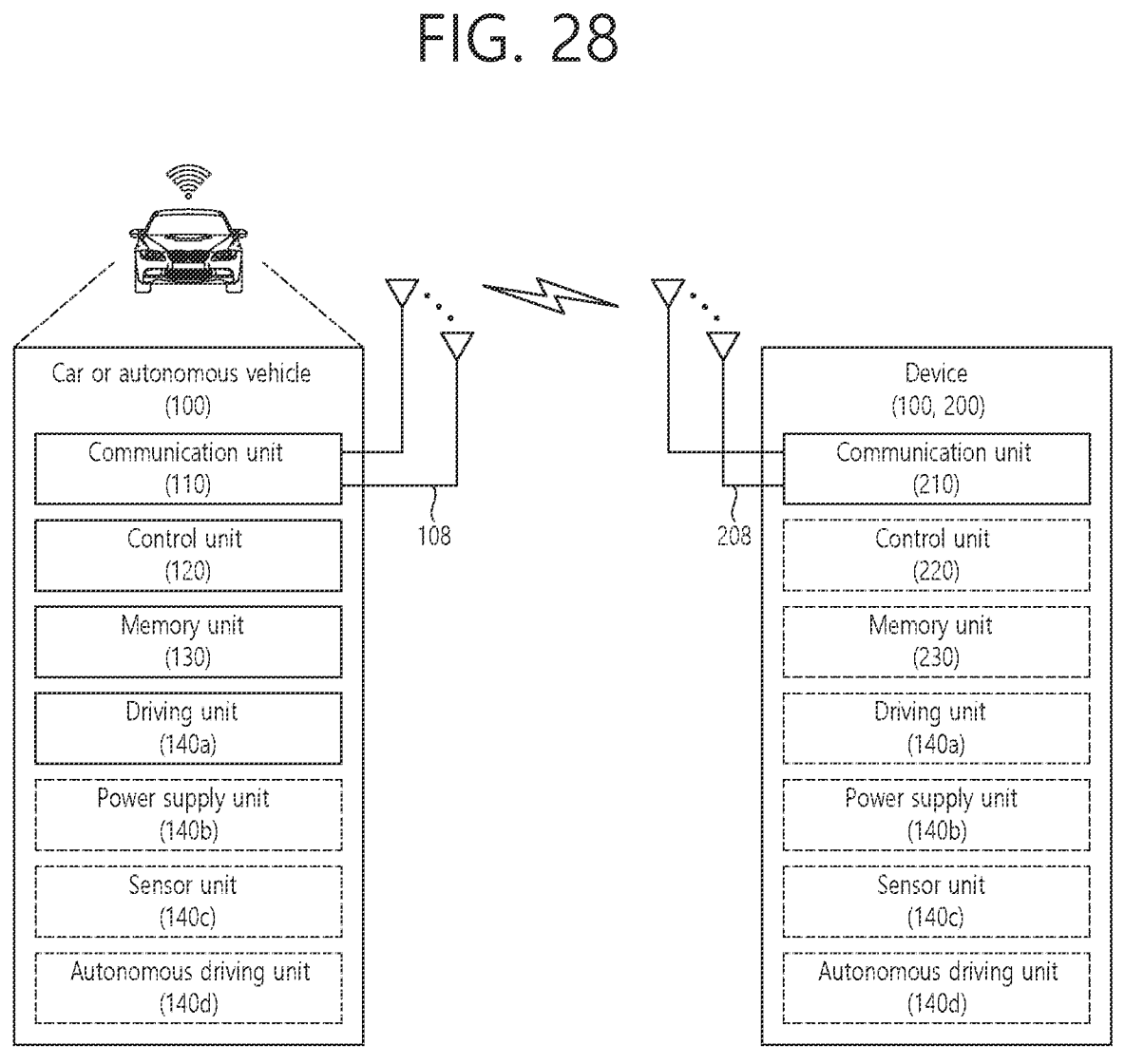

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

108

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

METHOD AND APPARATUS FOR MEASURING POSITION IN NR V2X

CROSS-REFERENCE TO RELATED APPLICATIONS

This application is a National Stage application under 35 U.S.C. § 371 of International Application No. PCT/KR2022/007263, filed on May 20, 2022, which claims the benefit of U.S. Provisional Application No. 63/191,285, filed on May 20, 2021. The disclosures of the prior applications are incorporated by reference in their entirety.

TECHNICAL FIELD

This disclosure relates to a wireless communication system.

BACKGROUND ART

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, for example, an observed time difference of arrival (OTDOA) positioning method may use measurement timing of downlink signals received by a UE from an eNB, an ng-eNB, and a plurality of three or more transmission points (TPs) including a positioning reference signal (PRS)-dedicated TP. For example, the OTDOA positioning method may measure a time of arrival (TOA) for each of a TP1, a TP2, and a TP3, calculate a reference signal time difference (RSTD) for TP1-TP2, an RSTD for TP2-TP3, and an RSTD for TP3-TP1, based on the three TOAs, determine a geometric hyperbola based on this, and estimate a point at which the hyperbolas intersect as a location of the UE. The conventional TDOA-based positioning method including the OTDOA and uplink time difference of arrival (UTDOA) may have a problem in that three or more anchor nodes used as a reference for positioning are required. The anchor node may be a base station (BS), a transmission/reception point (TRP), a road side unit (RSU), or a UE, of which a location is known in advance. In addition, the conventional enhanced cell ID (E-CID) positioning method may have a problem in that geographical information of a serving cell and additional UE measurement, and/or NG-RAN radio resources or the like are more required.

In an embodiment, a method in which a first device performs wireless communication is provided. In the method in which the first device performs wireless communication, the method may include: selecting a synchronization reference, wherein the synchronization reference is at least one of a global navigation satellite system (GNSS), a base station (BS), and a user equipment (UE); obtaining synchronization based on a synchronization signal received from the synchronization reference; transmitting a second positioning reference signal (PRS) to a second device and a third device at a time point added by a threshold from a first time point at which a first PRS is received; obtaining information on a sum of a first distance between the first device and the second device and a second distance between the first device and the third device, based on the first time point, a second time point at which the second PRS is received by the second device, and a third time point at which the second PRS is received by the third device; and obtaining information on a location of the first device, based on the information on the sum of the first distance and the second distance.

Additionally or alternatively, the method may further include obtaining information related to GNSS-based synchronization or eNB/gNB-based synchronization.

Additionally or alternatively, the method may further include obtaining configuration information related to a PRS. The PRS may include a first PRS and/or a second PRS.

Additionally or alternatively, the method may include obtaining information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to an uplink (UL) resource. The information related to the resource for reception of the PRS may include information related to a downlink (DL) resource.

In an embodiment, a first device performing wireless communication is provided. The first device may include: one or more memories storing instructions; one or more transceivers; and one or more processors coupling the one or more memories and the one or more transceivers. The one or more processors may execute the instructions to: select a synchronization reference, wherein the synchronization reference is at least one of a GNSS, a BS, and a UE; obtain synchronization based on a synchronization signal received from the synchronization reference; receive a first PRS from a second device; transmit a second PRS to the second device and a third device at a time point added by a threshold from a first time point at which the first PRS is received; obtain information on a sum of a first distance between the first device and the second device and a second distance between the first device and the third device, based on the first time point, a second time point at which the second PRS is received by the second device, and a third time point at which the second PRS is received by the third device; and obtain information on a location of the first device, based on the information on the sum of the first distance and the second distance.

Additionally or alternatively, the first device may obtain information related to GNSS-based synchronization or eNB/gNB-based synchronization.

Additionally or alternatively, the first device may obtain configuration information related to a PRS. The PRS may include a first PRS and/or a second PRS.

Additionally or alternatively, the first device may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, an apparatus configured to control a first UE is provided. The apparatus may include: one or more processors; and one or more memoires operatively coupled by means of the one or more processors and storing instructions to: select a synchronization reference, wherein the synchronization reference is at least one of a GNSS, a BS, and a UE; obtain synchronization based on a synchronization signal received from the synchronization reference; receive a first PRS from a first BS; transmit a second PRS to the first BS and a second BS at a time point added by a threshold from a first time point at which the first PRS is received; obtain information on a sum of a first distance between the first UE and the first BS and a second distance between the first UE and a second BS, based on the first time point, a second time point at which the second PRS is received by the first BS, and a third time point at which the second PRS is received by the second BS; and obtain information on a location of the first UE, based on the information on the sum of the first distance and the second distance.

Additionally or alternatively, the first UE may obtain information related to GNSS-based synchronization or eNB/gNB-based synchronization.

Additionally or alternatively, the first UE may obtain configuration information related to a PRS. The PRS may include a first PRS and/or a second PRS.

Additionally or alternatively, the first UE may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, a non-transitory computer-readable medium having instructions recorded thereon is proposed. The instructions, when executed by one or more processors, may cause the one or more processors to: cause a first device to select a synchronization reference, wherein the synchronization reference is at least one of a GNSS, a BS, and a UE; cause the first device to obtain synchronization based on a synchronization signal received from the synchronization reference; cause the first device to receive a first PRS from a second device; cause the first device to transmit a second PRS to the second device and a third device at a time point added by a threshold from a first time point at which the first PRS is received; cause the first device to obtain information on a sum of a first distance between the first device and the second device and a second distance between the first device and the third device, based on the first time point, a second time point at which the second PRS is received by the second device, and a third time point at which the second PRS is received by the third device; and cause the first device to obtain information on a location of the first device, based on the information on the sum of the first distance and the second distance.

Additionally or alternatively, the instructions, when executed by one or more processors, may cause the one or more processors to cause the first device to obtain information related to GNSS-based synchronization or eNB/gNB-based synchronization.

Additionally or alternatively, the instructions, when executed by one or more processors, may cause the one or more processors to cause the first device to obtain configuration information related to a PRS. The PRS may include a first PRS and/or a second PRS.

Additionally or alternatively, the instructions, when executed by one or more processors, may cause the one or more processors to cause the first device to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, a method in which a second device performs wireless communication is proposed. The method may include: selecting a synchronization reference, wherein the synchronization reference is at least one of a GNSS, a BS, and a UE; obtaining synchronization based on a synchronization signal received from the synchronization reference; transmitting a first PRS to the first device; obtaining information on a sum of a first distance between the first device and the second device and a second distance between the first device and a third device, based on a first time point at which the first PRS is received by the first device, a second time point at which a second PRS is received by the second device, and a third time point at which the second PRS is received by the third device; and obtaining information on a location of the first device, based on the information on the sum of the first distance and the second distance.

Additionally or alternatively, the method may further include obtaining information related to GNSS-based synchronization or eNB/gNB-based synchronization.

Additionally or alternatively, the method may further include obtaining configuration information related to a PRS. The PRS may include a first PRS and/or a second PRS.

Additionally or alternatively, the method may include obtaining information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, a second device performing wireless communication is provided. The second device may include: one or more memories storing instructions; one or more transceivers; and one or more processors coupling the one or more memories and the one or more transceivers. The one or more processors may execute the instructions to: select a synchronization reference, wherein the synchronization reference is at least one of a GNSS, a BS, and a UE; obtain synchronization based on a synchronization signal received from the synchronization reference; transmit a first PRS to a first device; obtain information on a sum of a first distance between the first device and the second device and a second distance between the first device and a third device, based on a first time point at which the first PRS is received by the first device, a second time point at which a second PRS is received by the second device, and a third time point at which the second PRS is received by the third device; and obtain information on a location of the first device, based on the information on the sum of the first distance and the second distance.

Additionally or alternatively, the second device may obtain information related to GNSS-based synchronization or eNB/gNB-based synchronization.

Additionally or alternatively, the second device may obtain configuration information related to a PRS. The PRS may include a first PRS and/or a second PRS.

Additionally or alternatively, the second device may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, an apparatus configured to control a first BS is provided. The apparatus may include: one or more processors; and one or more memoires operatively coupled by means of the one or more processors and storing instructions. The one or more processors may execute the instructions to: select a synchronization reference, wherein the synchronization reference is at least one of a GNSS, a BS, and a UE; obtain synchronization based on a synchronization signal received from the synchronization reference; transmit a first PRS to a first UE; obtain information on a sum of a first distance between the first UE and the first BS and a second distance between the first UE and a second BS, based on a first time point at which the first PRS is received by the first UE, a second time point at which a second PRS is received by the first BS, and a third time point at which the second PRS is received by the second BS; and obtain information on a location of the first UE, based on the information the sum of the first distance and the second distance.

Additionally or alternatively, the first BS may obtain information related to GNSS-based synchronization or eNB/gNB-based synchronization.

Additionally or alternatively, the first BS may obtain configuration information related to a PRS. The PRS may include a first PRS and/or a second PRS.

Additionally or alternatively, the first BS may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

In an embodiment, a non-transitory computer-readable medium having instructions recorded thereon is provided. The instructions, when executed by one or more processors, may cause the one or more processors to: cause a second device to select a synchronization reference, wherein the synchronization reference is at least one of a GNSS, a BS, and a UE; cause the second device to obtain synchronization based on a synchronization signal received from the synchronization reference; cause the second device to transmit a first PRS to a first device; cause the second device to obtain information on a sum of a first distance between the first device and the second device and a second distance between the first device and a third device, based on a first time point at which the first PRS is received by the first device, a second time point at which a second PRS is received by the second device, and a third time point at which the second PRS is received by the third device; and cause the second device to obtain information on a location of the first device, based on the information on the sum of the first distance and the second distance.

Additionally or alternatively, the instructions, when executed by one or more processors, may cause the one or more processors to cause the second device to obtain information related to GNSS-based synchronization or eNB/gNB-based synchronization.

Additionally or alternatively, the instructions, when executed by one or more processors, may cause the one or more processors to cause the second device to obtain configuration information related to a PRS. The PRS may include a first PRS and/or a second PRS.

Additionally or alternatively, the instructions, when executed by one or more processors, may cause the one or more processors to cause the second device to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

A UE can efficiently perform sidelink communication.

BRIEF DESCRIPTION OF THE DRAWINGS

FIG. 2 shows a radio protocol architecture, based on an embodiment of the present disclosure.

FIG. 9 shows an example of an architecture of a 5G system capable of positioning a UE having access to a next generation-radio access network (NG-RAN) or an E-UTRAN based on an embodiment of the present disclosure.

FIG. 20 is a drawing for explaining a procedure of measuring a location of a UE, according to an embodiment of the present disclosure.

FIG. 21 shows a method for performing wireless communication by a first device, based on an embodiment of the present disclosure.

FIG. 26 shows another example of a wireless device, based on an embodiment of the present disclosure.

FIG. 28 shows a vehicle or an autonomous vehicle, based on an embodiment of the present disclosure.

MODE FOR INVENTION

Figure 1:
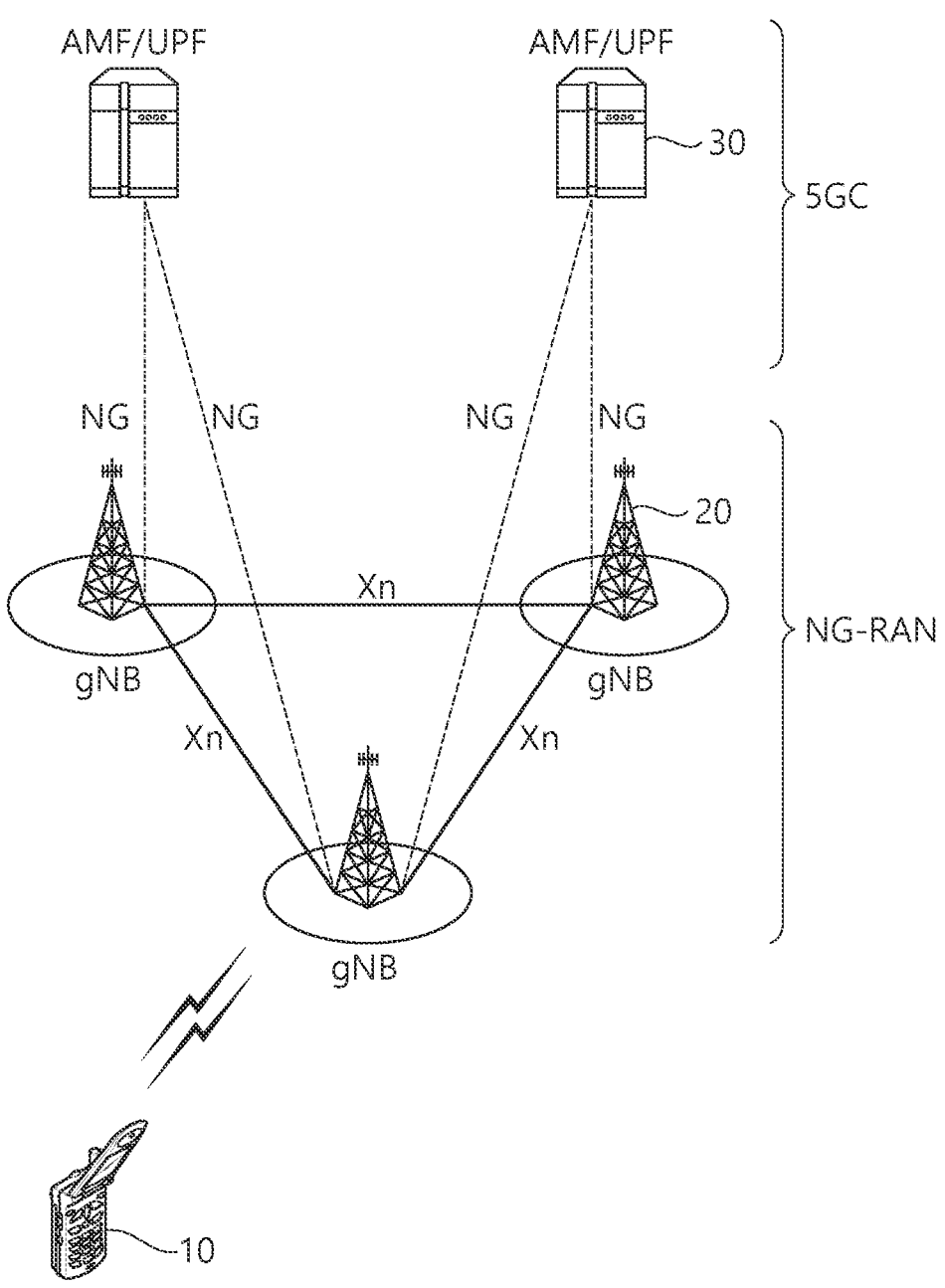
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
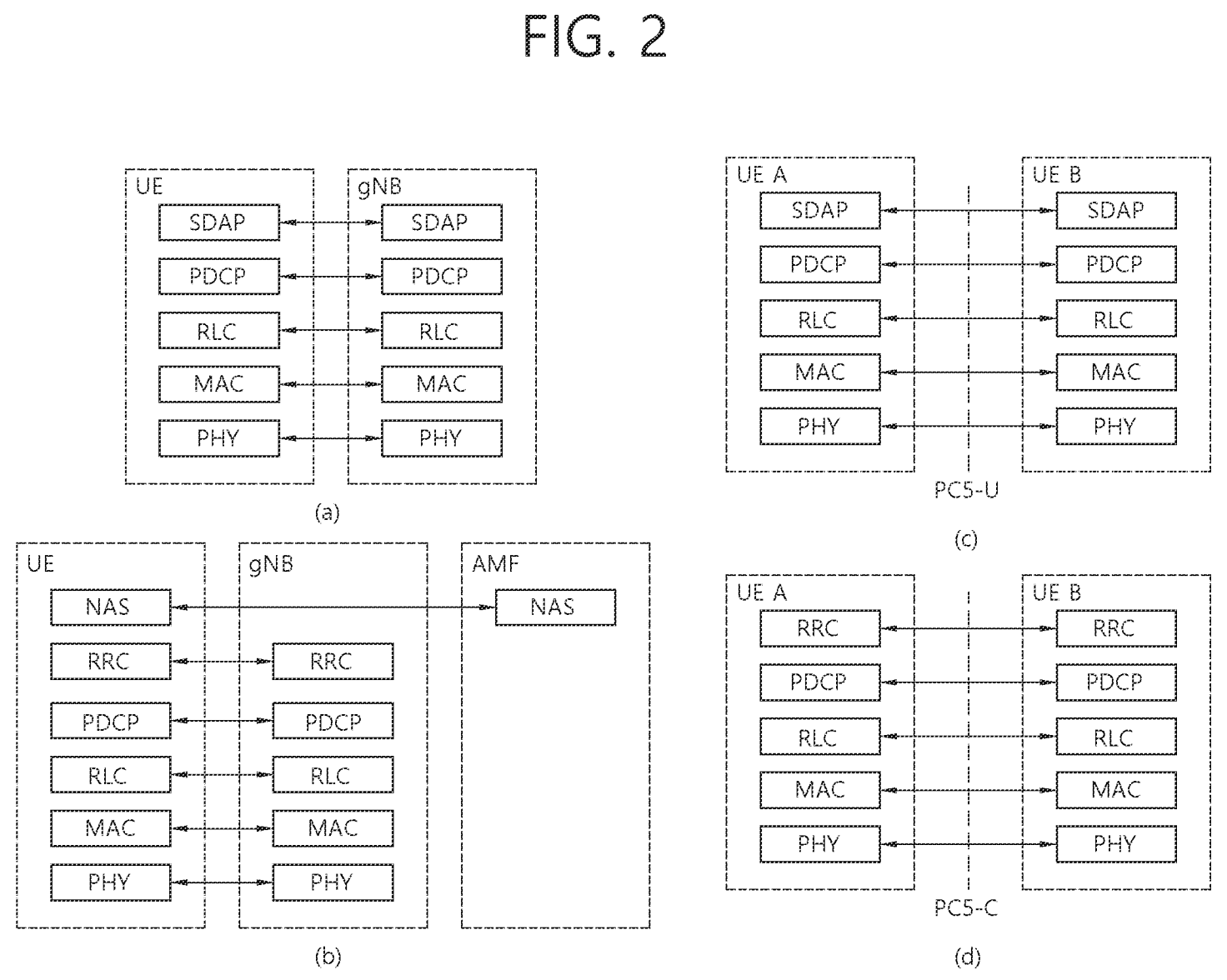

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (Qos) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
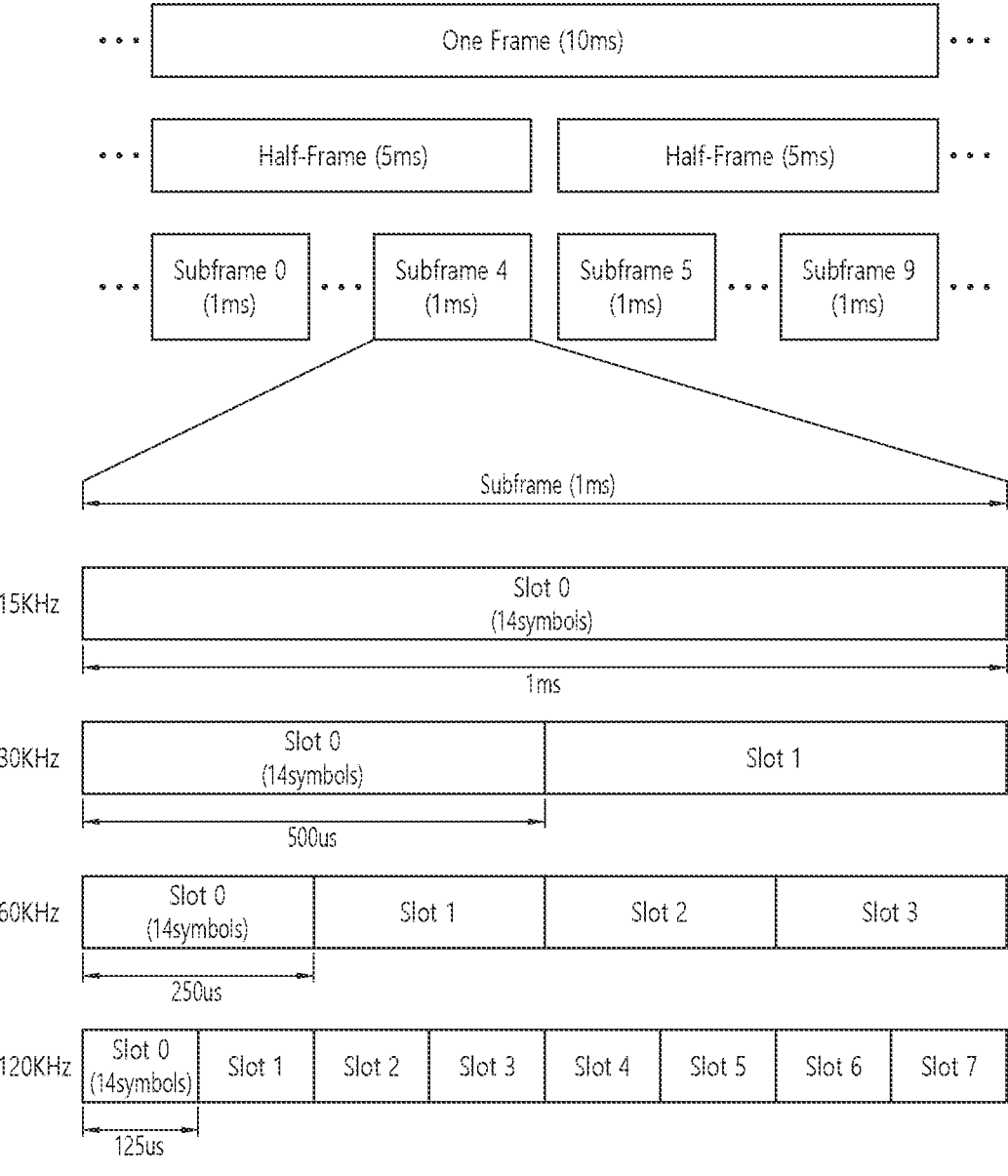
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 KHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz - 6000 MHz | 15, 30, 60 kHz |
| FR2 | 24250 MHz - 52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz - 7125 MHz | 15, 30, 60 kHz |
| FR2 | 24250 MHz - 52600 MHz | 60, 120, 240 kHz |

Figure 4:
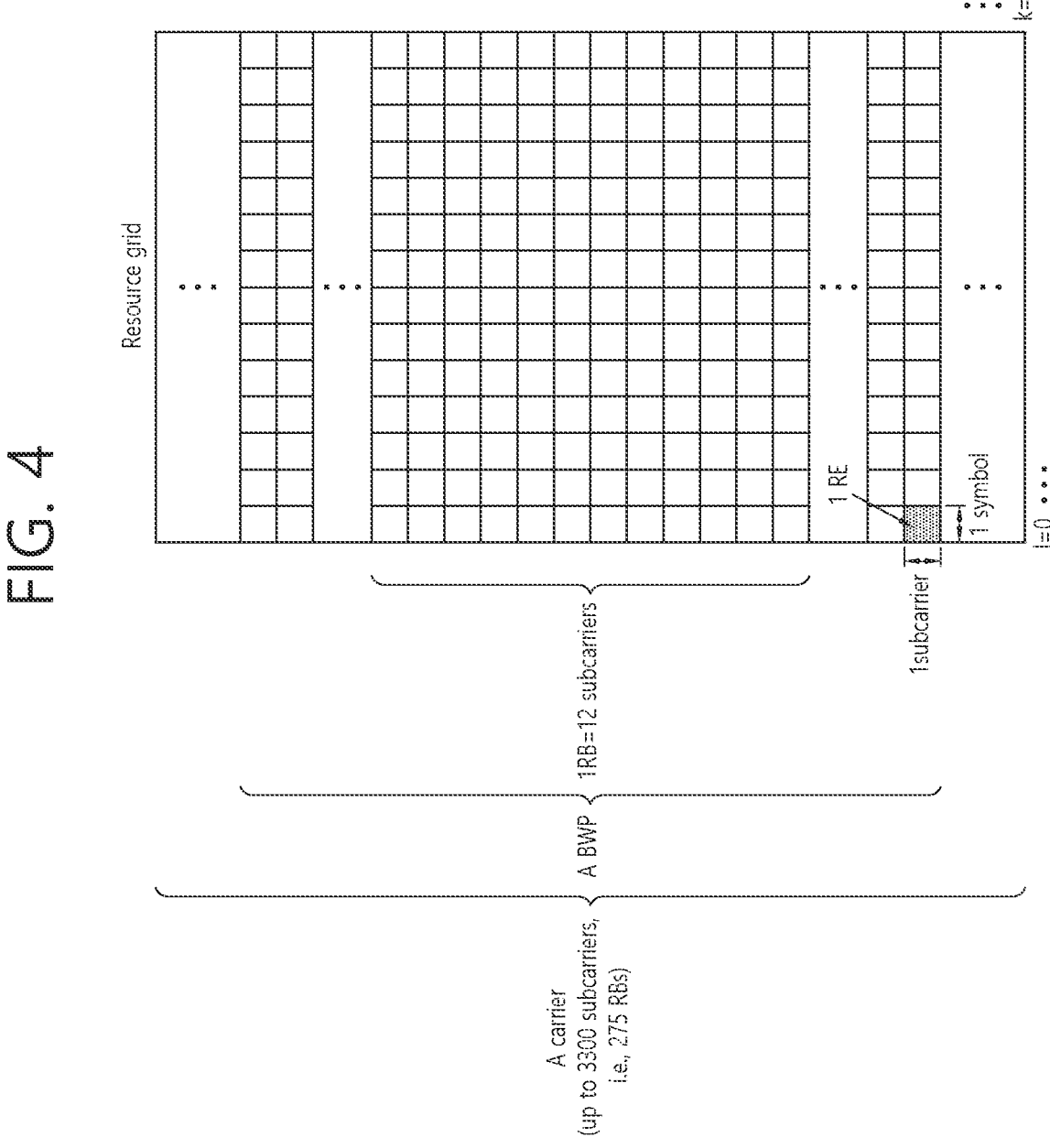
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE For the UE in the RRC_CONNECTED mode, at least one SL BWP may be activated in the carrier.

Figure 5:
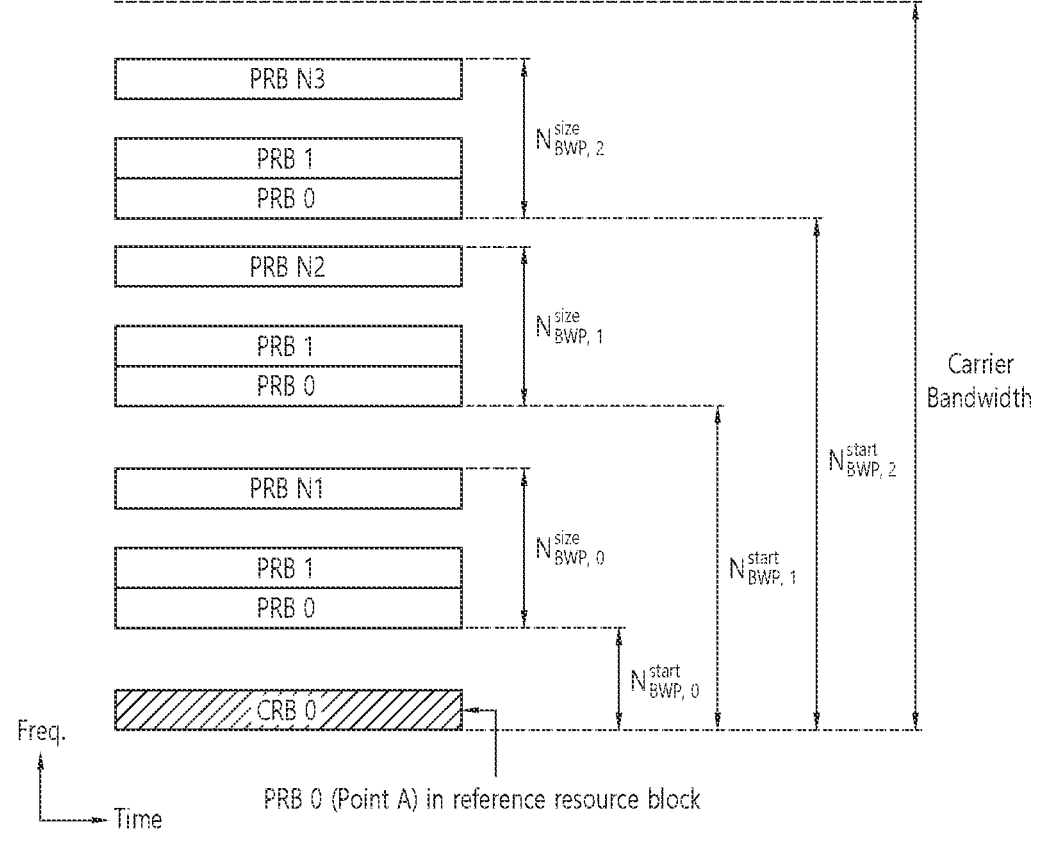
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
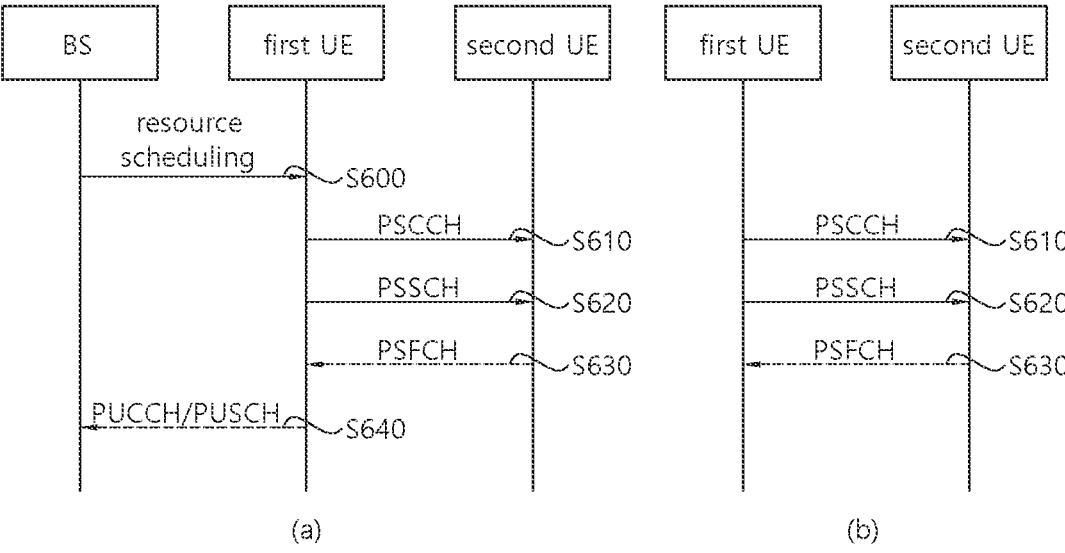
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 15-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH.

The following information is transmitted by means of the SCI format 1-A:

Priority—3 bits

Frequency resource assignment—ceiling ($\log_2 (N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
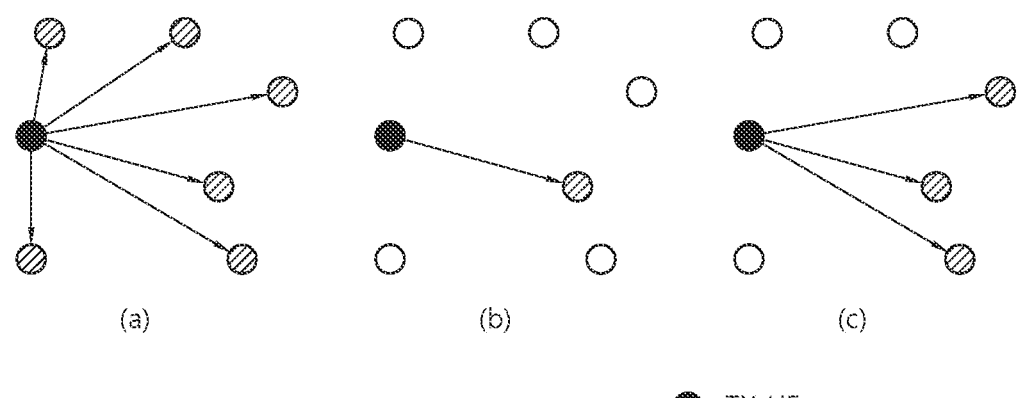
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, the Sidelink Synchronization Signal (SLSS) and synchronization information will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Hereinafter, synchronization acquisition of a SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 8:
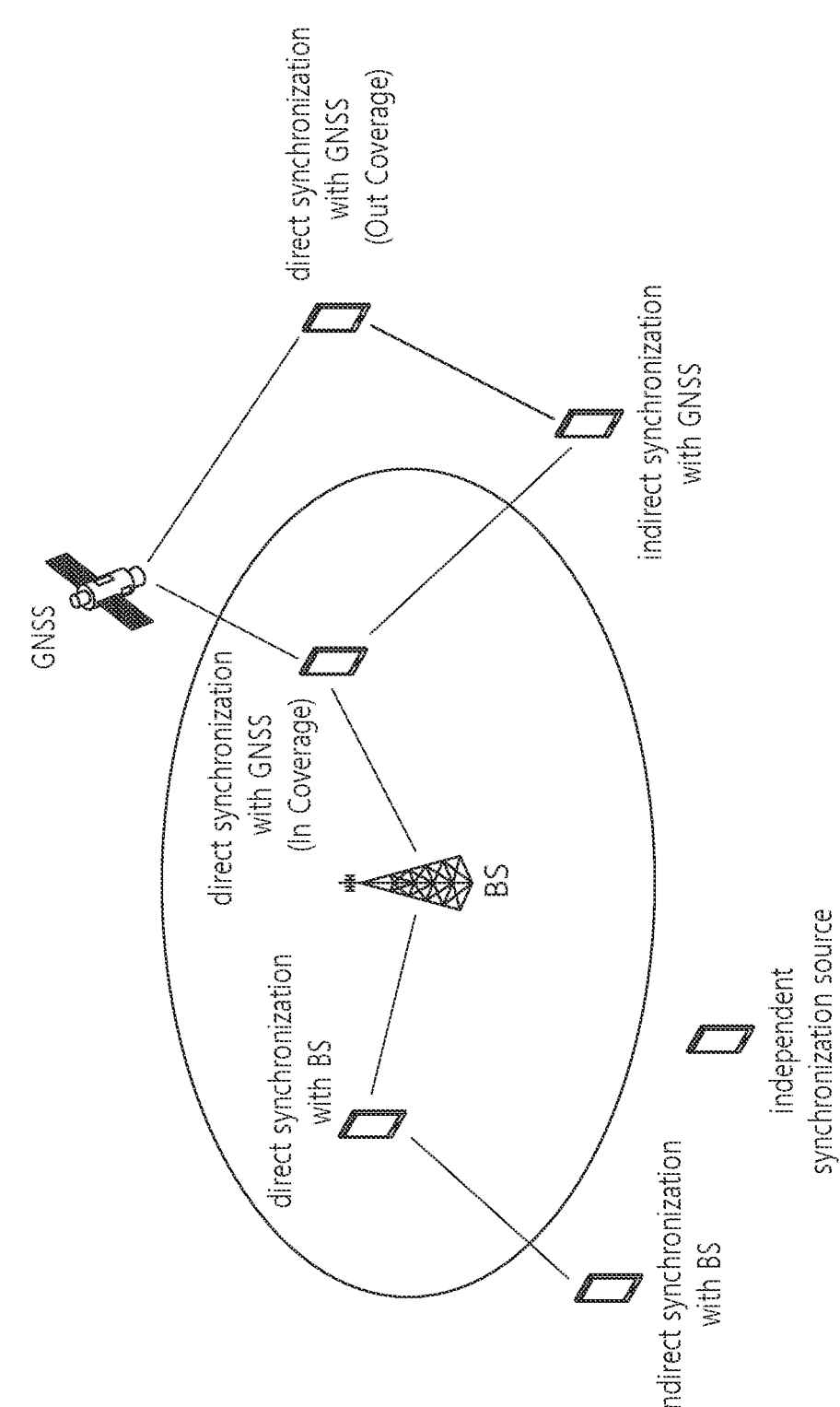
FIG. 8 shows a synchronization source or synchronization reference of V2X, based on an embodiment of the present disclosure.

FIG. 8 shows a synchronization source or synchronization reference of V2X, based on an embodiment of the present disclosure. The embodiment of FIG. 8 may be combined with various embodiments of the present disclosure.

Referring to FIG. 8, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 8 or Table 9. Table 8 or Table 9 are for exemplary purposes only, and the relation between the synchronization source and the synchronization priority may be defined in various forms.

TABLE 8

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 9

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 8 or Table 9, P0 may denote a highest priority, and P6 may denote a lowest priority. In Table 8 or Table 9, the BS may include at least one of a gNB and an eNB. Whether to use GNSS-based synchronization or BS-based synchronization may be (pre-)configured. In a single-carrier operation, the UE may derive transmission timing of the UE from an available synchronization reference having the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Hereinafter, positioning will be described.

Configuration for downlink (DL) PRS may include the following fields.

1) nr-DL-PRS-ResourceSetID

This field specifies the DL-PRS Resource Set ID, which is used to identify the DL-PRS Resource Set of the TRP across all the frequency layers.

2) dl-PRS-Periodicity-and-ResourceSetSlotOffset

This field specifies the periodicity of DL-PRS allocation in slots configured per DL-PRS Resource Set and the slot offset with respect to SFN #0 slot #0 for a TRP where the DL-PRS Resource Set is configured (i.e. slot where the first DL-PRS Resource of DL-PRS Resource Set occurs).

3) dl-PRS-ResourceRepetitionFactor

This field specifies how many times each DL-PRS Resource is repeated for a single instance of the DL-PRS Resource Set. It is applied to all resources of the DL-PRS Resource Set. Enumerated values n2, n4, n6, n8, n16, n32 correspond to 2, 4, 6, 8, 16, 32 resource repetitions, respectively. If this field is absent, the value for dl-PRS-ResourceRepetitionFactor is 1 (i.e., no resource repetition).

4) dl-PRS-ResourceTimeGap

This field specifies the offset in units of slots between two repeated instances of a DL-PRS Resource corresponding to the same DL-PRS Resource ID within a single instance of the DL-PRS Resource Set. The time duration spanned by one DL-PRS Resource Set containing repeated DL-PRS Resources should not exceed DL-PRS-Periodicity.

5) dl-PRS-NumSymbols

This field specifies the number of symbols per DL-PRS Resource within a slot.

6) dl-PRS-MutingOption1

This field specifies the DL-PRS muting configuration of the TRP for the Option-1 muting, as specified in TS 38.214 [45], and comprises the following sub-fields:

dl-prs-MutingBitRepetitionFactor indicates the number of consecutive instances of the DL-PRS Resource Set corresponding to a single bit of the nr-option1-muting bit map. Enumerated values n1, n2, n4, n8 correspond to 1, 2, 4, 8 consecutive instances, respectively. If this sub-field is absent, the value for dl-prs-MutingBitRepetitionFactor is n1.

nr-option1-muting defines a bitmap of the time locations where the DL-PRS Resource is transmitted (value '1') or not (value '0') for a DL-PRS Resource Set, If this field is absent, Option-1 muting is not in use for the TRP.)

7) dl-PRS-MutingOption2

This field specifies the DL-PRS muting configuration of the TRP for the Option-2 muting, and comprises the following sub-fields:

nr-option2-muting defines a bitmap of the time locations where the DL-PRS Resource is transmitted (value '1') or not (value '0'). Each bit of the bitmap corresponds to a single repetition of the DL-PRS Resource within an instance of a DL-PRS Resource Set The size of this bitmap should be the same as the value for dl-PRS-ResourceRepetitionFactor. If this field is absent, Option-2 muting is not in use for the TRP.

8) dl-PRS-ResourcePower

This field specifies the average EPRE of the resources elements that carry the PRS in dBm that is used for PRS transmission. The UE assumes constant EPRE is used for all REs of a given DL-PRS resource.

9) dl-PRS-SequenceID

This field specifies the sequence Id used to initialize cinit value used in pseudo random generator for generation of DL-PRS sequence for transmission on a given DL-PRS Resource.

10) dl-PRS-CombSizeN-AndReOffset

This field specifies the Resource Element spacing in each symbol of the DL-PRS Resource and the Resource Element (RE) offset in the frequency domain for the first symbol in a DL-PRS Resource. All DL-PRS Resource Sets belonging to the same Positioning Frequency Layer have the same value of comb size. The relative RE offsets of following symbols are defined relative to the RE Offset in the frequency domain of the first symbol in the DL-PRS Resource. The comb size configuration should be aligned with the comb size configuration for the frequency layer.

11) dl-PRS-ResourceSlotOffset

This field specifies the starting slot of the DL-PRS Resource with respect to the corresponding DL-PRS-Resource Set Slot Offset.

12) dl-PRS-ResourceSymbolOffset

This field specifies the starting symbol of the DL-PRS Resource within a slot determined by dl-PRS-ResourceSlotOffset.

13) dl-PRS-QCL-Info

This field specifies the QCL indication with other DL reference signals for serving and neighbouring cells and comprises the following subfields:

ssb indicates the SSB information for QCL source and comprises the following sub-fields;

pci specifies the physical cell ID of the cell with the SSB that is configured as the source reference signal for the DL-PRS. The UE obtains the SSB configuration for the SSB configured as source reference signal for the DL-PRS by indexing to the field nr-SSB-Config with this physical cell identity ssb-Index indicates the index for the SSB configured as the source reference signal for the DL-PRS.

rs-Type indicates the QCL type.

dl-PRS indicates the PRS information for QCL source reference signal and comprises the followings sub-fields:

qcl-DL-PRS-ResourceID specifies DL-PRS Resource ID of the DL-PRS resource used as the source reference signal.

qcl-DL-PRS-ResourceSetID indicates the DL-PRS Resource Set ID of the DL-PRS Resource Set used as the source reference signal.

14) dl-PRS-ResourcePrioritySubset

This field provides a subset of DL-PRS Resources, which is associated with nr-DL-PRS-ResourceID for the purpose of prioritization of DL-AoD reporting. For each nr-DL-PRS-ResourceID the dl-PRS-ResourcePrioritySubset indicates the associated DL-PRS Resources the target device should prioritize for DL-PRS RSRP and DL-PRS First Path RSRP measurement reporting in IE NR-DL-AoD-SignalMeasurementInformation.

Figure 9:
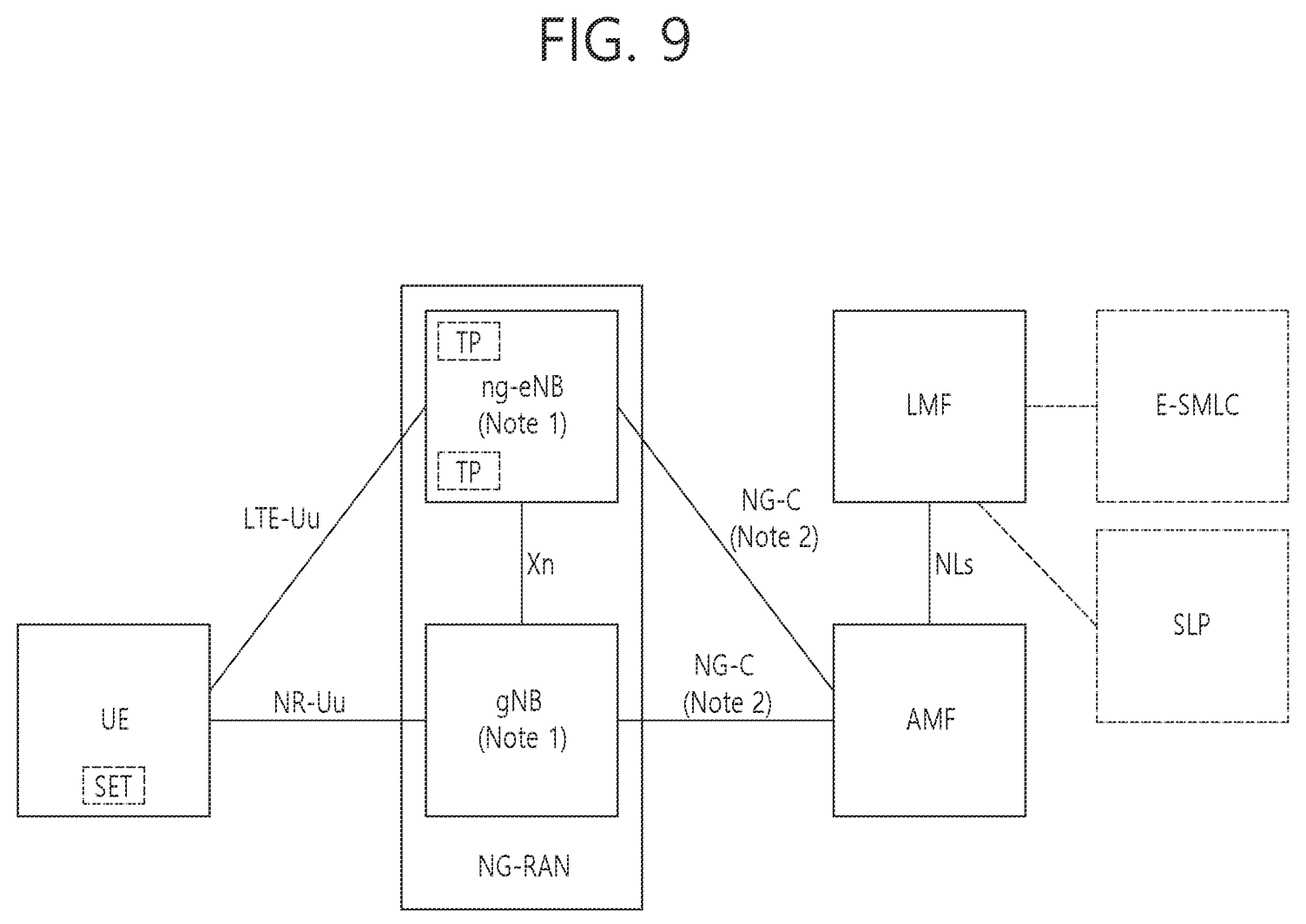

FIG. 9 shows an example of an architecture of a 5G system capable of positioning a UE having access to a next generation-radio access network (NG-RAN) or an E-UTRAN based on an embodiment of the present disclosure. The embodiment of FIG. 9 may be combined with various embodiments of the present disclosure.

Referring to FIG. 9, an AMF may receive a request for a location service related to a specific target UE from a different entity such as a gateway mobile location center (GMLC), or may determine to start the location service in the AMF itself instead of the specific target UE. Then, the AMF may transmit a location service request to a location management function (LMF). Upon receiving the location service request, the LMF may process the location service request and return a processing request including an estimated location or the like of the UE to the AMF. Meanwhile, if the location service request is received from the different entity such as GMLC other than the AMF, the AMF may transfer to the different entity the processing request received from the LMF.

A new generation evolved-NB (ng-eNB) and a gNB are network elements of NG-RAN capable of providing a measurement result for location estimation, and may measure a radio signal for a target UE and may transfer a resultant value to the LMF. In addition, the ng-eNB may control several transmission points (TPs) such as remote radio heads or PRS-dedicated TPs supporting a positioning reference signal (PRS)-based beacon system for E-UTRA.

The LMF may be connected to an enhanced serving mobile location centre (E-SMLC), and the E-SMLC may allow the LMF to access E-UTRAN. For example, the E-SMLC may allow the LMF to support observed time difference of arrival (OTDOA), which is one of positioning methods of E-UTRAN, by using downlink measurement obtained by a target UE through a signal transmitted from the gNB and/or the PRS-dedicated TPs in the E-UTRAN.

Meanwhile, the LMF may be connected to an SUPL location platform (SLP). The LMF may support and manage different location determining services for respective target UEs. The LMF may interact with a serving ng-eNB or serving gNB for the target UE to obtain location measurement of the UE. For positioning of the target UE, the LMF may determine a positioning method based on a location service (LCS) client type, a requested quality of service (QoS), UE positioning capabilities, gNB positioning capabilities, and ng-eNB positioning capabilities, or the like, and may apply such a positioning method to the serving gNB and/or the serving ng-eNB. In addition, the LMF may determine additional information such as a location estimation value for the target UE and accuracy of location estimation and speed. The SLP is a secure user plane location (SUPL) entity in charge of positioning through a user plane.

The UE may measure a downlink signal through NG-RAN, E-UTRAN, and/or other sources such as different global navigation satellite system (GNSS) and terrestrial beacon system (TBS), wireless local access network (WLAN) access points, Bluetooth beacons, UE barometric pressure sensors or the like. The UE may include an LCS application. The UE may communicate with a network to which the UE has access, or may access the LCS application through another application included in the UE. The LCS application may include a measurement and calculation function required to determine a location of the UE. For example, the UE may include an independent positioning function such as a global positioning system (GPS), and may report the location of the UE independent of NG-RAN transmission. Positioning information obtained independently as such may be utilized as assistance information of the positioning information obtained from the network.

Figure 10:
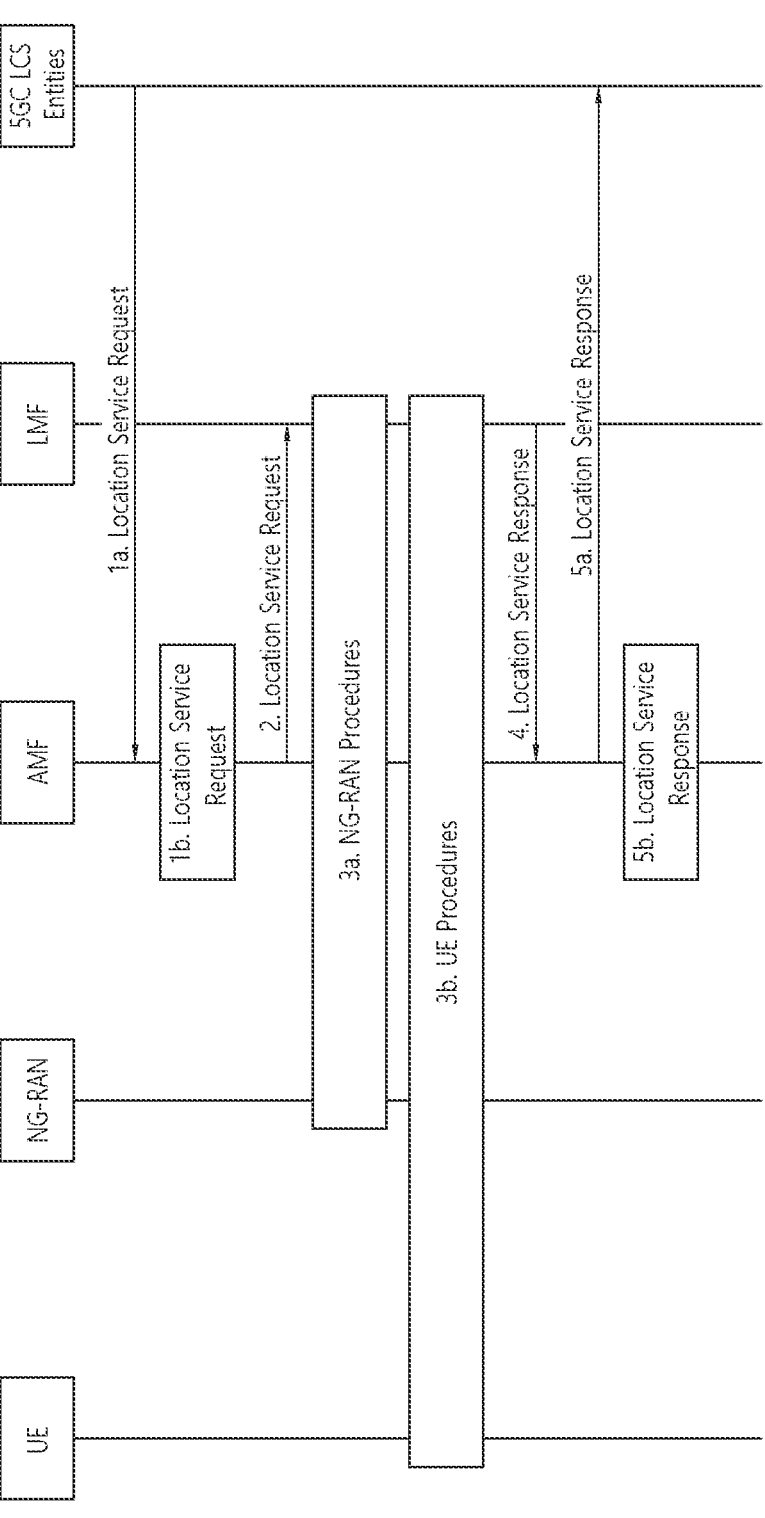
FIG. 10 shows an example of implementing a network for measuring a location of a UE based on an embodiment of the present disclosure.

FIG. 10 shows an example of implementing a network for measuring a location of a UE based on an embodiment of the present disclosure. The embodiment of FIG. 10 may be combined with various embodiments of the present disclosure.

When the UE is in a connection management (CM)-IDLE state, if an AMF receives a location service request, the AMF may establish a signaling connection with the UE, and may request for a network trigger service to allocate a specific serving gNB or ng-eNB. Such an operational process is omitted in FIG. 10. That is, it may be assumed in FIG. 10 that the UE is in a connected mode. However, due to signaling and data inactivation or the like, the signaling connection may be released by NG-RAN while a positioning process is performed.

A network operation process for measuring a location of a UE will be described in detail with reference to FIG. 10. In step a1, a 5GC entity such as GMLC may request a serving AMF to provide a location service for measuring a location of a target UE. However, even if the GMLC does not request for the location service, based on step 1b, the serving AMF may determine that the location service for measuring the location of the target UE is required. For example, to measure the location of the UE for an emergency call, the serving AMF may determine to directly perform the location service.

Thereafter, the AMF may transmit the location service request to an LMF based on step 2, and the LMF may start location procedures to obtain location measurement data or location measurement assistance data together with a serving ng-eNB and a serving gNB. Additionally, based on step 3b, the LMF may start location procedures for downlink positioning together with the UE. For example, the LMF may transmit assistance data defined in 3GPP TS 36.355, or may obtain a location estimation value or a location measurement value. Meanwhile, step 3b may be performed additionally after step 3a is performed, or may be performed instead of step 3a.

In step 4, the LMF may provide a location service response to the AMF. In addition, the location service response may include information on whether location estimation of the UE is successful and a location estimation value of the UE. Thereafter, if the procedure of FIG. 10 is initiated by step a1, the AMF may transfer the location service response to a 5GC entity such as GMLC, and if the procedure of FIG. 10 is initiated by step 1b, the AMF may use the location service response to provide a location service related to an emergency call or the like.

Figure 11:
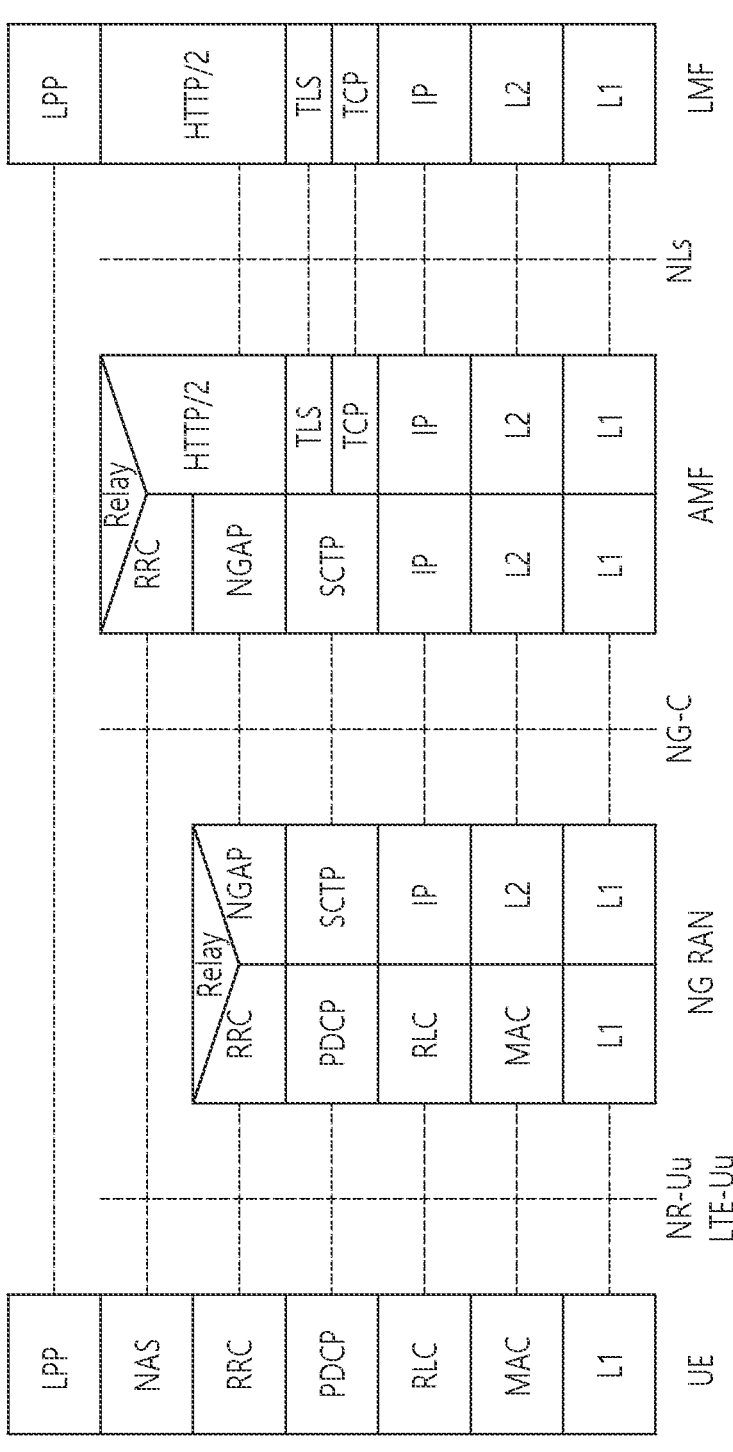
FIG. 11 shows an example of a protocol layer used to support LTE positioning protocol (LPP) message transmission between an LMF and a UE based on an embodiment of the present disclosure.

FIG. 11 shows an example of a protocol layer used to support LTE positioning protocol (LPP) message transmission between an LMF and a UE based on an embodiment of the present disclosure. The embodiment of FIG. 11 may be combined with various embodiments of the present disclosure.

An LPP PDU may be transmitted through a NAS PDU between an AMF and the UE. Referring to FIG. 11, an LPP may be terminated between a target device (e.g., a UE in a control plane or an SUPL enabled terminal (SET) in a user plane) and a location server (e.g., an LMF in the control plane and an SLP in the user plane). The LPP message may be transferred in a form of a transparent PDU through an intermediary network interface by using a proper protocol such as an NG application protocol (NGAP) through an NG-control plane (NG-C) interface and NAS/RRC or the like through an NR-Uu interface. The LPP protocol may enable positioning for NR and LTE by using various positioning methods.

For example, based on the LPP protocol, the target device and the location server may exchange mutual capability information, assistance data for positioning, and/or location information. In addition, an LPP message may be used to indicate exchange of error information and/or interruption of the LPP procedure.

Figure 12:
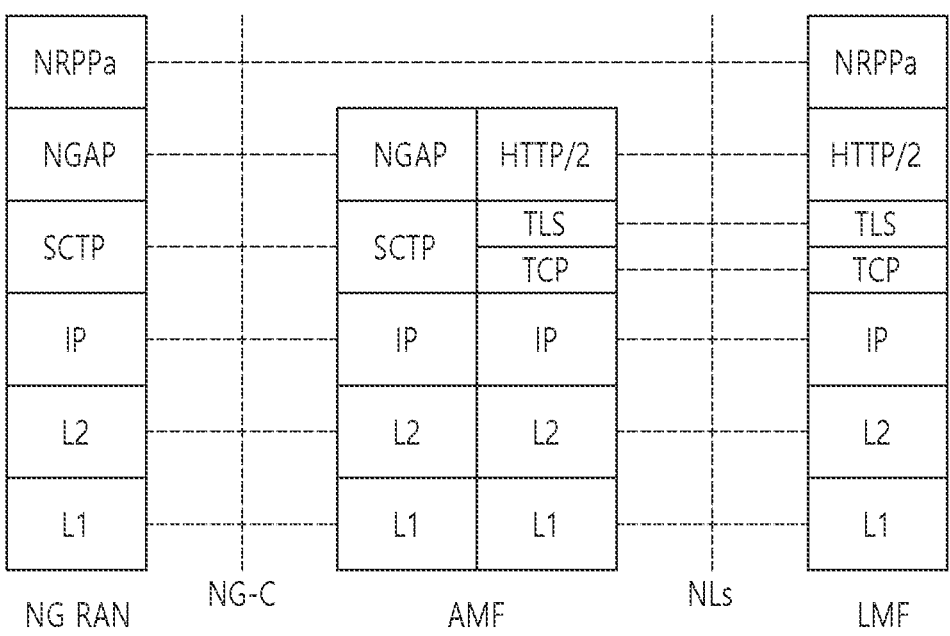
FIG. 12 shows an example of a protocol layer used to support NR positioning protocol A (NRPPa) PDU transmission between an LMF and an NG-RAN node based on an embodiment of the present disclosure.

FIG. 12 shows an example of a protocol layer used to support NR positioning protocol A (NRPPa) PDU transmission between an LMF and an NG-RAN node based on an embodiment of the present disclosure. The embodiment of FIG. 12 may be combined with various embodiments of the present disclosure.

The NRPPa may be used for information exchange between the NG-RAN node and the LMF. Specifically, the NRPPa may exchange an enhanced-cell ID (E-CID) for measurement, data for supporting an OTDOA positioning method, and a cell-ID, cell location ID, or the like for an NR cell ID positioning method, transmitted from the ng-eNB to the LMF. Even if there is no information on an associated NRPPa transaction, the AMF may route NRPPa PDUs based on a routing ID of an associated LMR through an NG-C interface.

A procedure of an NRPPa protocol for location and data collection may be classified into two types. A first type is a UE associated procedure for transferring information on a specific UE (e.g., location measurement information or the like), and a second type is a non UE associated procedure for transferring information (e.g., gNB/ng-eNB/TP timing information, etc.) applicable to an NG-RAN node and associated TPs. The two types of the procedure may be independently supported or may be simultaneously supported.

Meanwhile, examples of positioning methods supported in NG-RAN may include GNSS, OTDOA, enhanced cell ID (E-CID), barometric pressure sensor positioning, WLAN positioning, Bluetooth positioning and terrestrial beacon system (TBS), uplink time difference of arrival (UTDOA), etc.

(1) OTDOA (Observed Time Difference Of Arrival)

Figure 13:
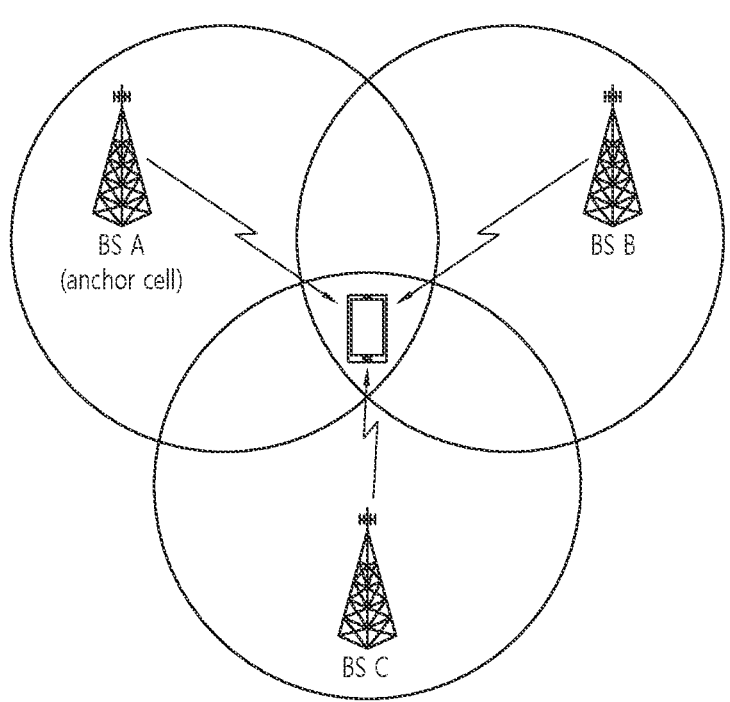
FIG. 13 is a drawing for explaining an OTDOA positioning method based on an embodiment of the present disclosure.

FIG. 13 is a drawing for explaining an OTDOA positioning method based on an embodiment of the present disclosure. The embodiment of FIG. 13 may be combined with various embodiments of the present disclosure.

The OTDOA positioning method uses measurement timing of downlink signals received by a UE from an eNB, an ng-eNB, and a plurality of TPs including a PRS-dedicated TP. The UE measures timing of downlink signals received by using location assistance data received from a location server. In addition, a location of the UE may be determined based on such a measurement result and geometric coordinates of neighboring TPs.

A UE connected to a gNB may request for a measurement gap for OTDOA measurement from the TP. If the UE cannot recognize a single frequency network (SFN) for at least one TP in the OTDOA assistance data, the UE may use an autonomous gap to obtain an SNF of an OTDOA reference cell before the measurement gap is requested to perform reference signal time difference (RSTD) measurement.

Herein, the RSTD may be defined based on a smallest relative time difference between boundaries of two subframes received respectively from a reference cell and a measurement cell. That is, the RSTD may be calculated based on a relative time difference between a start time of a subframe received from the measurement cell and a start time of a subframe of a reference cell closest to the start time of the subframe received from the measurement cell. Meanwhile, the reference cell may be selected by the UE.

For correct OTDOA measurement, it may be necessary to measure a time of arrival (TOA) of a signal received from three or more TPs or BSs geometrically distributed. For example, a TOA may be measured for each of a TP1, a TP2, and a TP3, and RSTD for TP1-TP2, RSTD for TP2-TP3, and RSTD for TP3-TP1 may be calculated for the three TOAs. Based on this, a geometric hyperbola may be determined, and a point at which these hyperbolas intersect may be estimated as a location of a UE. In this case, since accuracy and/or uncertainty for each TOA measurement may be present, the estimated location of the UE may be known as a specific range based on measurement uncertainty.

For example, RSTD for two TPs may be calculated based on Equation 1.

$$RST\, Di, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad \text{[Equation 1]}$$

Herein, c may be the speed of light, {xt, yt} may be a (unknown) coordinate of a target UE, {xi, yi} may be a coordinate of a (known) TP, and {x1, y1} may be a coordinate of a reference TP (or another TP). Herein, (Ti–T1) may be referred to as "real time differences (RTDs)" as a transmission time offset between two TPs, and ni, n1 may represent values related to UE TOA measurement errors.

(2) E-CID (Enhanced Cell ID)

In a cell ID (CID) positioning method, a location of a UE may be measured through geometric information of a serving ng-eNB, serving gNB, and/or serving cell of the UE. For example, the geometric information of the serving ng-eNB, serving gNB, and/or serving cell may be obtained through paging, registration, or the like.

Meanwhile, in addition to the CID positioning method, an E-CID positioning method may use additional UE measurement and/or NG-RAN radio resources or the like to improve a UE location estimation value. In the E-CID positioning method, although some of the measurement methods which are the same as those used in a measurement control system of an RRC protocol may be used, additional measurement is not performed in general only for location measurement of the UE. In other words, a measurement configuration or a measurement control message may not be provided additionally to measure the location of the UE. Also, the UE may not expect that an additional measurement operation only for location measurement will be requested, and may report a measurement value obtained through measurement methods in which the UE can perform measurement in a general manner.

For example, the serving gNB may use an E-UTRA measurement value provided from the UE to implement the E-CID positioning method.

Examples of a measurement element that can be used for E-CID positioning may be as follows.

UE measurement: E-UTRA reference signal received power (RSRP), E-UTRA reference signal received quality (RSRQ), UE E-UTRA Rx-Tx Time difference, GSM EDGE random access network (GERAN)/ WLAN reference signal strength indication (RSSI), UTRAN common pilot channel (CPICH) received signal code power (RSCP), UTRAN CPICH Ec/Io E-UTRAN measurement: ng-eNB Rx-Tx Time difference, timing advance (TADV), angle of arrival (AoA)

Herein, the TADV may be classified into Type 1 and Type 2 as follows.

TADV Type 1=(ng-eNB Rx-Tx time difference)+(UE E-UTRA Rx-Tx time difference)

TADV Type 2=ng-eNB Rx-Tx time difference

Meanwhile, AoA may be used to measure a direction of the UE. The AoA may be defined as an estimation angle with respect to the location of the UE counterclockwise from a BS/TP. In this case, a geographic reference direction may be north. The BS/TP may use an uplink signal such as a sounding reference signal (SRS) and/or a demodulation reference signal (DMRS) for AoA measurement. In addition, the larger the arrangement of the antenna array, the higher the measurement accuracy of the AoA. When the antenna arrays are arranged with the same interval, signals received from adjacent antenna elements may have a constant phase-rotate.

(3) UTDOA (Uplink Time Difference of Arrival)

UTDOA is a method of determining a location of a UE by estimating an arrival time of SRS. When calculating an estimated SRS arrival time, the location of the UE may be estimated through an arrival time difference with respect to another cell (or BS/TP) by using a serving cell as a reference cell. In order to implement the UTDOA, E-SMLC may indicate a serving cell of a target UE to indicate SRS transmission to the target UE. In addition, the E-SMLC may provide a configuration such as whether the SRS is periodical/aperiodical, a bandwidth, frequency/group/sequence hopping, or the like.

Table 10 shows an example of reference signal time difference (RSTD). The RSTD of Table 10 may be applied for SL positioning.

TABLE 10

| Definition | The relative timing difference between the E-UTRA neighbour cell j and the E-UTRA reference cell i, defined as $T_{SubframeRxj} - T_{SubframeRxi}$, where: $T_{SubframeRxj}$ is the time when the UE receives the start of one subframe from E-UTRA cell j $T_{SubframeRxi}$ is the time when the UE receives the corresponding start of one subframe from E-UTRA cell i that is closest in time to the subframe received from E-UTRA cell j. The reference point for the observed subframe time difference shall be the antenna connector of the UE. |
|---|---|
| Applicable for | RRC_CONNECTED inter-RAT |

Table 11 shows an example of DL PRS reference signal received power (RSRP). The DL PRS RSRP of Table 11 may be applied for SL positioning.

TABLE 11

| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth. For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
|---|---|
| Applicable for | RRC_CONNECTED intra-frequency, RRC_CONNECTED inter-frequency |

Table 12 shows an example of DL relative signal time difference (RSTD). The DL RSTD of Table 12 may be applied for SL positioning.

TABLE 12

| Definition | DL relative timing difference (DL RSTD) between the positioning node j and the reference positioning node i, is defined as $T_{SubframeRxj} - T_{SubframeRxi}$, Where: $T_{SubframeRxj}$ is the time when the UE receives the start of one subframe from positioning node j. $T_{SubframeRxi}$ is the time when the UE receives the corresponding start of one subframe from positioning node i that is closest in time to the subframe received from positioning node j. Multiple DL PRS resources can be used to determine the start of one subframe from a positioning node. For frequency range 1, the reference point for the DL RSTD shall be the antenna connector of the UE. For frequency range 2, the reference point for the DL RSTD shall be the antenna of the UE. |
|---|---|
| Applicable for | RRC_CONNECTED intra-frequency RRC_CONNECTED inter-frequency |

Table 13 shows an example of UE Rx-Tx time difference. The UE Rx-Tx time difference of Table 13 may be applied for SL positioning.

TABLE 13

| Definition | The UE Rx – Tx time difference is defined as $T_{UE-RX} - T_{UE-TX}$ Where: $T_{UE-RX}$ is the UE received timing of downlink subframe #i from a positioning node, defined by the first detected path in time. $T_{UE-TX}$ is the UE transmit timing of uplink subframe #j that is closest in time to the subframe #i received from the positioning node. Multiple DL PRS resources can be used to determine the start of one subframe of the first arrival path of the positioning node. For frequency range 1, the reference point for $T_{UE-RX}$ measurement shall be the Rx antenna connector of the UE and the reference point for $T_{UE-TX}$ measurement shall be the Tx antenna connector of the UE. For frequency |
|---|---|

TABLE 13-continued

| | |
|---|---|
| | range 2, the reference point for $T_{UE-RX}$ measurement shall be the Rx antenna of the UE and the reference point for $T_{UE-RX}$ measurement shall be the Tx antenna of the UE. |
| Applicable for | RRC_CONNECTED intra-frequency<br>RRC_CONNECTED inter-frequency |

Table 14 shows an example of UL Relative. Time of Arrival (UL RTOA) (TUL-RTOA). The UL RTOA of Table 14 may be applied for SL positioning.

TABLE 14

| | |
|---|---|
| Definition | [The UL Relative Time of Arrival ($T_{UL-RTOA}$) is the beginning of subframe i containing SRS received in positioning node j, relative to the configurable reference time.]<br>Multiple SRS resources for positioning can be used to determine the beginning of one subframe containing SRS received at a positioning node.<br>The reference point for $T_{UL-RTOA}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector. |

Table 15 shows an example of gNB Rx-Tx time difference. The gNB Rx-Tx time difference of Table 15 may be applied for SL positioning.

TABLE 15

| | |
|---|---|
| Definition | The gNB Rx – Tx time difference is defined as $T_{gNB-RX} - T_{gNB-TX}$<br>Where:<br>$T_{gNB-RX}$ is the positioning node received timing of uplink subframe #i containing SRS associated with UE, defined by the first detected path in time.<br>$T_{gNB-TX}$ is the positioning node transmit timing of downlink subframe #j that is closest in time to the subframe #i received from the UE.<br>Multiple SRS resources for positioning can be used to determine the start of one subframe containing SRS.<br>The reference point for $T_{gNB-RX}$ shall be:<br>for type 1-C base station TS 38.104 [9]: the Rx antenna connector,<br>for type 1-O or 2-O base station TS 38.104 [9]: the Rx antenna,<br>for type 1-H base station TS 38.104 [9]: the Rx Transceiver Array Boundary connector.<br>The reference point for $T_{gNB-TX}$ shall be:<br>for type 1-C base station TS 38.104 [9]: the Tx antenna connector,<br>for type 1-O or 2-O base station TS 38.104 [9]: the Tx antenna,<br>for type 1-H base station TS 38.104 [9]: the Tx Transceiver Array Boundary connector. |

Table 16 shows an example of UL Angle of Arrival (AoA). The UL AoA of Table 16 may be applied for SL positioning.

TABLE 16

| | |
|---|---|
| Definition | UL Angle of Arrival (UL AoA) is defined as the estimated azimuth angle and vertical angle of a UE with respect to a reference direction, wherein the reference direction is defined:<br>In the global coordinate system (GCS), wherein estimated azimuth angle is measured relative to geographical North and is positive in a counter-clockwise direction and estimated vertical angle is measured relative to zenith and positive to horizontal direction<br>In the local coordinate system (LCS), wherein estimated azimuth angle is measured relative to x-axis of LCS and positive in a counter-clockwise direction and estimated vertical angle is measured relatize to z-axis of LCS and positive to x-y plane direction. The bearing, downtilt and slant angles of LCS are defined according to TS 38.901 [14].<br>The UL AoA is determined at the gNB antenna for an UL channel corresponding to this UE. |

Table 17 shows an example of UL SRS reference signal received power (RSRP). The UL SRS RSRP of Table 17 may be applied for SL positioning.

TABLE 17

| Definition | UL SRS reference signal received power (UL SRS-RSRP) is defined as linear average of the power contributions (in [W]) of the resource elements carrying sounding reference signals (SRS). UL SRS-RSRP shall be measured over the configured resource elements within the considered measurement frequency bandwidth in the configured measurement time occasions. For frequency range 1, the reference point for the UL SRS-RSRP shall be the antenna connector of the gNB. For frequency range 2, UL SRS-RSRP shall be measured based on the combined signal from antenna elements corresponding to a given receiver branch. For frequency range 1 and 2, if receiver diversity is in use by the gNB, the reported UL SRS-RSRP value shall not be lower than the corresponding UL SRS-RSRP of any of the individual receiver branches. |
|---|---|

Figure 14:
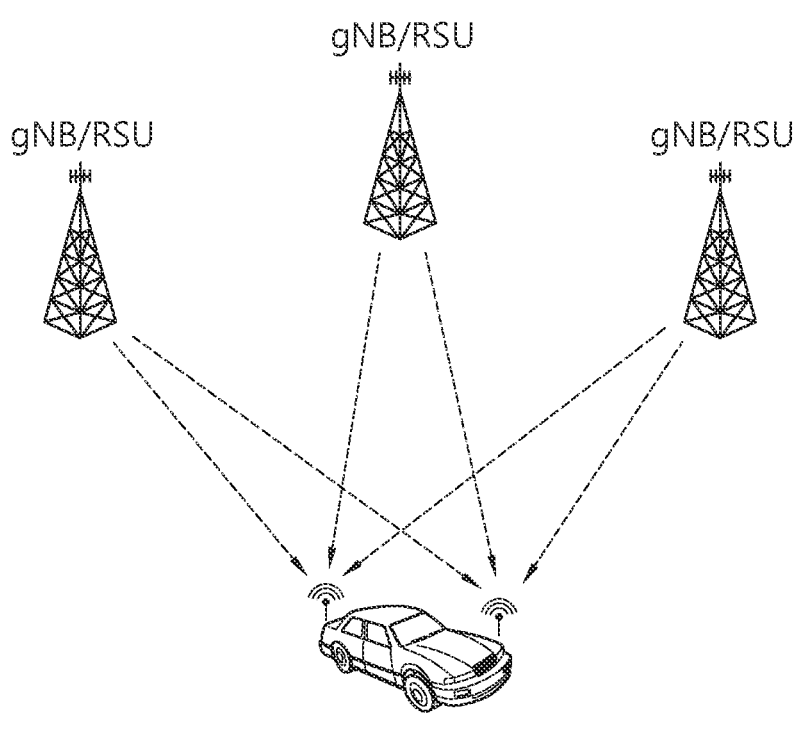
FIG. 14 is a drawing illustrating an example of a distributed antenna system (DAS) according to an embodiment of the present disclosure.

FIG. 14 is a diagram illustrating an example of a distributed antenna system (DAS) according to an embodiment of the present disclosure.

In general sense of this technique, the locations of antennas are properly determined and exploited for the purpose of positioning enhancement. Locating antennas can be implemented on both sides; it can be the form of antenna distribution on the vehicle side (a.k.a. DAS) and it can appear as an RSU deployment on the infrastructure side.

It is noticed that DAS on a terminal is considered as an important solution to increase communication capability such as an antenna coverage. For example, when considering two antenna panels for DAS, each panel can be installed at the front bumper and at the rear bumper (or at the front rooftop and at the rear rooftop), respectively as shown in FIG. 14.

The aim of antenna distribution technique is to leverage DAS to improve the positioning performance such as accuracy, reliability and availability. The positioning accuracy and reliability can be improved by properly combining the measurements from distributed antennas, as described below.

In case of a vehicle, the vehicle is usually represented with its reference point (e.g. the center of the vehicle) as its location, which is signaled in e.g. CAM message. After estimating each antenna location with e.g. TDOA method, the estimated antenna location can be converted to the vehicle location using the geometry of DAS.

Figure 15:
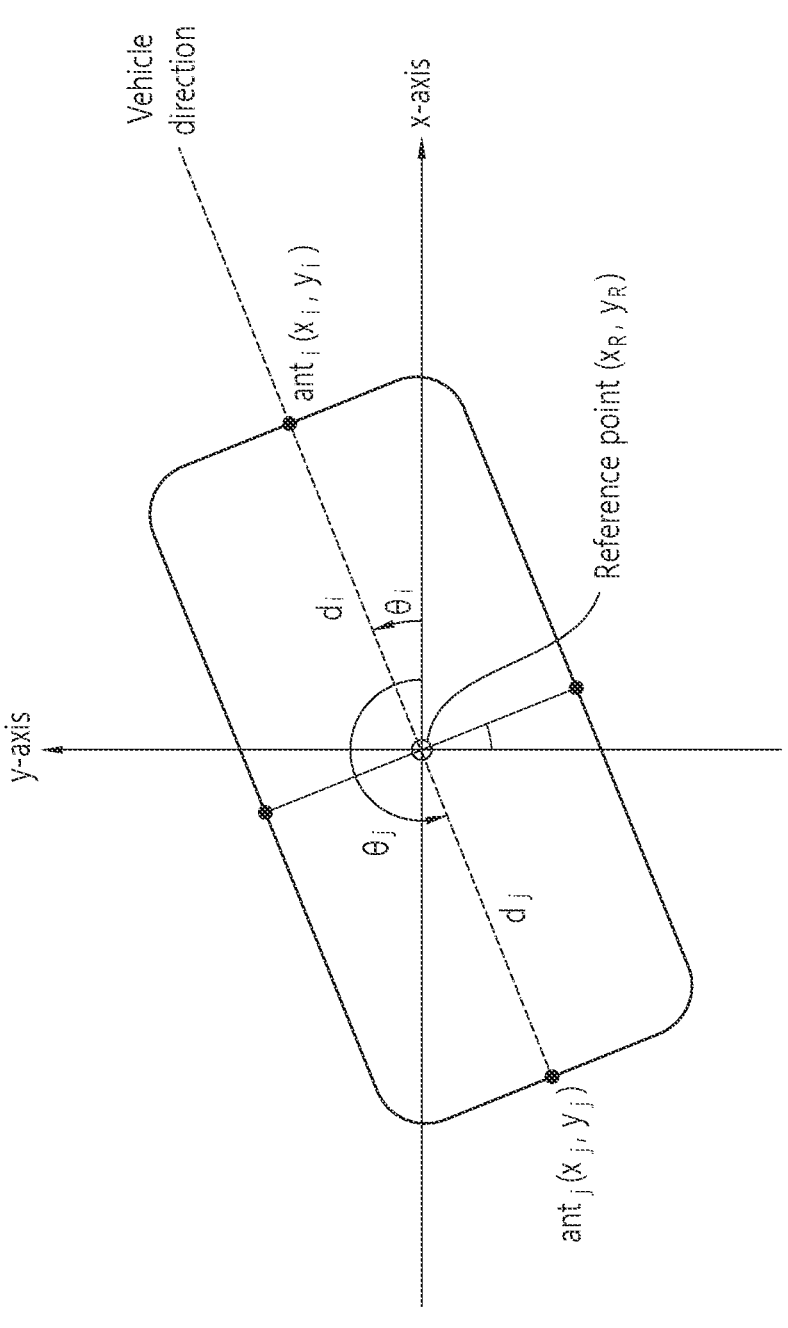
FIG. 15 is a drawing illustrating an example of a reference point of a DAS and a vehicle according to an embodiment of the present disclosure.

FIG. 15 is a diagram illustrating an example of a reference point of a distributed antenna system (DAS) and a vehicle according to an embodiment of the present disclosure.

Let's assume that multiple DAS antennas are mounted on a vehicle, as shown in FIG. 15. The number and the location of the DAS antennas may depends on the V2X performance/coverage requirements and the shape/design of a vehicle. Let $(x_i, y_i)$, $d_i$, and $\theta_i$ be the location, the distance from the reference point, and the angle between the vehicle direction and the coordinate direction of the i-th antenna. Then the reference point $(x_{Ri}, y_{Ri})$ converted from the i-th antenna location $(x_i, y_i)$ is obtained by the following equation.

$$(x_{Ri}, y_{Ri}) = (x_i, y_i) - (d_i \cos(\theta_i), d_i \sin(\theta_i)) \qquad \text{[Equation 2]}$$

As explained above, the vehicle location can be independently estimated from each antenna position of DAS. To improve the accuracy of vehicle positioning, those vehicle locations independently estimated from each antenna can be combined together. One of the solutions may be to apply a weighting factor based on the reliability of each estimate, which can be decided according to the received signal quality or the number of RSUs/gNBs used for each antenna positioning. The final reference point location $(x_R, y_R)$, that is the vehicle location, can be determined as follows.

$$(x_R, y_R) = \sum \beta_{Ri} \cdot (x_{Ri}, y_{Ri}), \qquad \text{[Equation 3]}$$

where $0 \leq \beta_{Ri} \leq 1$ is a weighting factor for the estimated reference point $(x_{Ri}, y_{Ri})$ and $\rho\beta_{Ri}=1$ needs to be satisfied.

As an another example, when a TDoA-based positioning such as OTDoA is supported from gNBs/RSUs, the accuracy and reliability of positioning can be degraded due to an imperfect synchronization among gNRs/RSUs. The effect of the timing error can be mitigated by subtracting two TDoA measurements from two distributed antennas, where two TDoA measurements are obtained for the same pair of gNBs/RSUs.

Let's assume there are multiple (at least 3) RSUs around a vehicle, on which multiple DAS antennas are mounted. The timing error $te_{i,j}$ between i-th RSU and j-th RSU can be cancelled out from the two RSTDs estimated at m-th antenna and n-th antenna of DAS, with the following equations.

$$RSTD_{i,j}^m = \tau_{RSU_i}^m - \tau_{RSU_j}^m + te_{i,j} + e_m \qquad \text{[Equation 4]}$$

$$RSTD_{i,j}^n = \tau_{RSU_i}^n - \tau_{RSU_j}^n + te_{i,j} + e_n$$

$$RSTD_{i,j}^m - RSTD_{i,j}^n = \left(\tau_{RSU_i}^m - \tau_{RSU_j}^m\right) - \left(\tau_{RSU_i}^n - \tau_{RSU_j}^n\right) + e$$

where $e_m$ and $e_n$ are the estimation error at m-th and n-th antenna respectively, and $e=e_m-e_n$ is the resultant estimation error. If more than two above equations are obtained over different pair of RSUs, the antenna location thereby the vehicle location can be estimated without degradation by the network timing synchronization error. It's an important benefit of DAS in that it does not require any network synchronization condition for high accuracy positioning.

Figure 16:
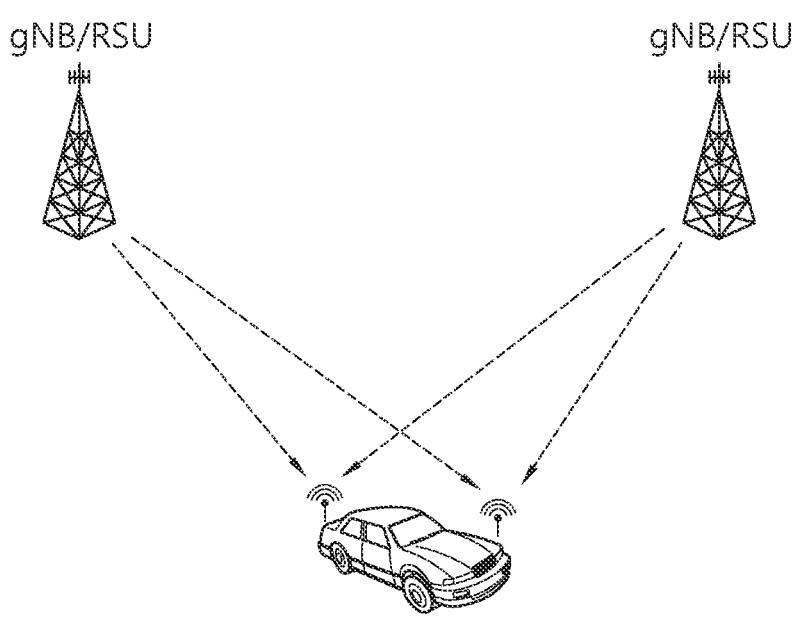
FIG. 16 is a drawing illustrating an example of positioning using two next generation node Bs (gNBs)/road side units (RSUs) according to an embodiment of the present disclosure.

FIG. 16 shows an example of positioning using two next generation node B (gNB)/road side unit (RSU) according to an embodiment of the present disclosure.

For another instance, the antenna distribution technique enables acquiring the position even with the reduced number of gNB/RSU. The RSTDs measured at each antenna can be combined with the absolute position information of the RSUs/gNBs to calculate the absolute position of a terminal, though there are less than 3 RSUs/gNBs required by the conventional OTDoA method.

In FIG. 16, utilizing the known distance between two antennas enables a vehicle to perform position calculation even with 2 gNBs/RSUs.

$$RSTD_{i,j}^m = \sqrt{(x_{RSU_i} - x_m)^2 + (y_{RSU_i} - y_m)^2} / c -$$
$$\sqrt{(x_{RSU_j} - x_m^2 + (y_{RSU_j} - y_m^2) / c + e_m}$$

$$RSTD_{i,j}^n =$$
$$\sqrt{(x_{RSU_i} - x_n)^2 + (y_{RSU_i} - y_n)^2} / c - \sqrt{(x_{RSU_j} - x_n^2 + (y_{RSU_j} - y_n^2) / c + e_n}$$

[Equation 5]

where $(x_{RSU_i}, y_{RSU_i})$ and $(x_{RSU_j}, y_{RSU_j})$ are the known coordinate of the i-th RSU and j-th RSU respectively, and $(x_m, y_m)$ and $(x_n, y_n$ are the coordinate of the m-th and n-th antenna respectively. As the displacement between any two antennas is known, the coordinate of n-th antenna can be expressed with the coordinate of m-th antenna, which doesn't create a new unknown value. So there are only two unknown values $(x_m, y_m)$ with two independent equations, we can solve the equations. As a result, if two DAS antennas are mounted on a vehicle, only two RSUs are required for absolute vehicle positioning.

Figure 17:
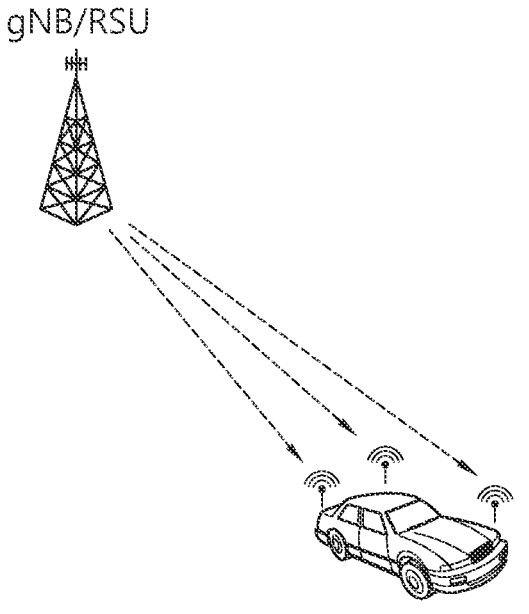
FIG. 17 is a drawing illustrating an example of positioning using a single gNB/RSU according to an embodiment of the present disclosure.

FIG. 17 shows an example of positioning using a single next generation node B (gNB)/road side unit (RSU) according to an embodiment of the present disclosure.

Even with a single RSU, the absolute vehicle positioning can be acquired if there are more than 2 DAS antennas mounted on a vehicle, as depicted in FIG. 17. Two different pairs of the DAS antennas provide two independent RSTD equations as follows.

$$RSTD_i^{m,n} = \sqrt{(x_{RSU_i} - x_m)^2 + (y_{RSU_i} - y_m)^2} / c -$$
$$\sqrt{(x_{RSU_i} - x_n)^2 + (y_{RSU_i} - y_n)^2} / c + e_{m,n}$$

$$RSTD_i^{m,k} =$$
$$\sqrt{(x_{RSU_i} - x_m)^2 + (y_{RSU_i} - y_m)^2} / c - \sqrt{(x_{RSU_i} - x_k)^2 + (y_{RSU_i} - y_k)^2} / c + e_{m,k}$$

[Equation 6]

where $RSTD_i^{m,n}$ is the RSTD between m-th and n-th antenna over the i-th RSU, and $e_{m,n}$ is the estimation error in using m-th and n-th antenna. As stated earlier, the coordinates of all the antennas can be represented by the coordinate of a 'reference' antenna and the displacement from the reference antenna. Again, there are only two unknown values $(x_m, y_m)$ with two independent equations, we can solve the equations. As a conclusion, if more than two DAS antennas are mounted on a vehicle, only single RSU is necessary for absolute vehicle positioning.

From the positioning performance perspective, the positions of the DAS antennas on a vehicle may affect the performance. There are two aspects that needs to be considered in determining the antenna positions and the distance between the antennas—PRS receiving path discrimination and positioning diversity. As for the path discrimination, if the antennas is too close in position (e.g. back-to-back panel type), there may be almost no difference in e.g. TOA or AOA measured at each antenna over the PRS transmitted from the RSU. This causes difficulty in calculating the position of the antennas or the vehicle.

Concerning the positioning diversity, if the positioning calculation is not possible with one of the DAS antennas due to e.g. the insufficient number of RSUs, then the other antennas can be used for positioning measurement. This kind of diversity may not be achieved if the distance between two antennas is too small (e.g. less than a half of the PRS wavelength). Considering all the aspects above, the maximum achievable distance between antennas is good for DAS-based sidelink positioning.

Figure 18:
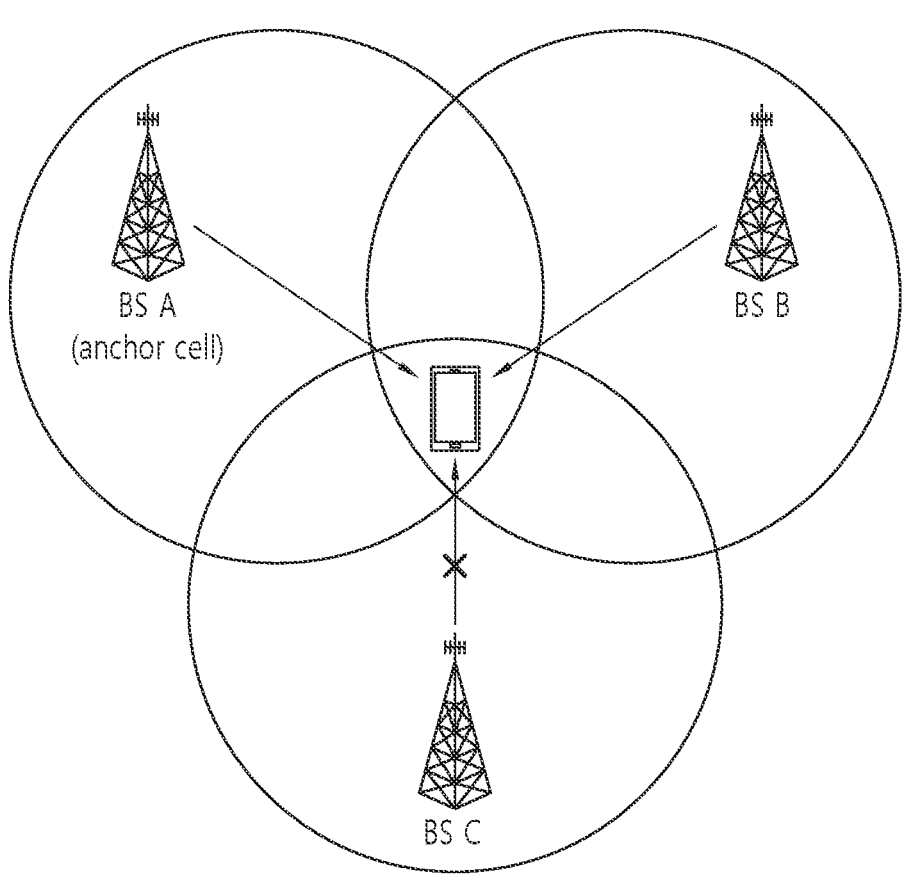
FIG. 18 is a drawing for explaining a problem of a method of positioning a UE, according to an embodiment of the present disclosure.

FIG. 18 is a drawing for explaining a problem of a method of positioning a UE, according to an embodiment of the present disclosure. The embodiment of FIG. 18 may be combined with various embodiments of the present disclosure.

Referring to FIG. 18, according to an embodiment of the present disclosure, for example, the UE may obtain a location of the UE, based on a result of measuring a reception time point (hereinafter, a time of arrival (TOA)) of a signal received from three or more anchor cells (or anchor nodes) or base stations (BSs) (e.g., BS A, BS B, and BS C) or a result of measuring a time of flight (TOF). For example, the UE may obtain the location of the UE, based on a geographical location of each of the three or more anchor nodes (or anchor cells) or BSs (e.g., BS A, BS B, and BS C), the result of measuring the TOA of the signal received from each of the BSs, or the result of measuring the TOF. For example, the signal may include a positioning reference signal. For example, the UE may use an autonomous gap or a measurement gap received by requesting each BS to measure a reference signal time difference (RSTD). For example, the UE may measure the TOA for each of the BS A, the BS B, and the BS C, calculate the RSTD for the BS A-BS B, the RSTD for the BS B-BS C, and the RSTD for the BS C-BS A, based on three TOAs and real time differences (RTDs) of the BS A, the BS B, and the BS C to determine a geometric hyperbola based thereon, and estimate a point at which the hyperbolas intersect as the location of the UE.

For example, the estimated location of the UE may be obtained in a specific range depending on uncertainty of TOA measurement. Therefore, if the UE is not present within the coverage of the BS C, the UE cannot calculate the RSTD for the BS B-BS C and the RSTD for the BS C-BS A. For example, if the UE is not present within the coverage of the BS C, the UE may calculate incorrectly the RSTD for the BS B-BS C and the RSTD for the BS C-BS A, based on a case where the UE is present at a boundary of the coverage of the BS C. For example, if the UE is not present within the coverage of the BS C, the UE location estimated based on the calculation of the RSTD for the BS B-B C and the RSTD for the BS C-BS A may be incorrect.

Figure 19:
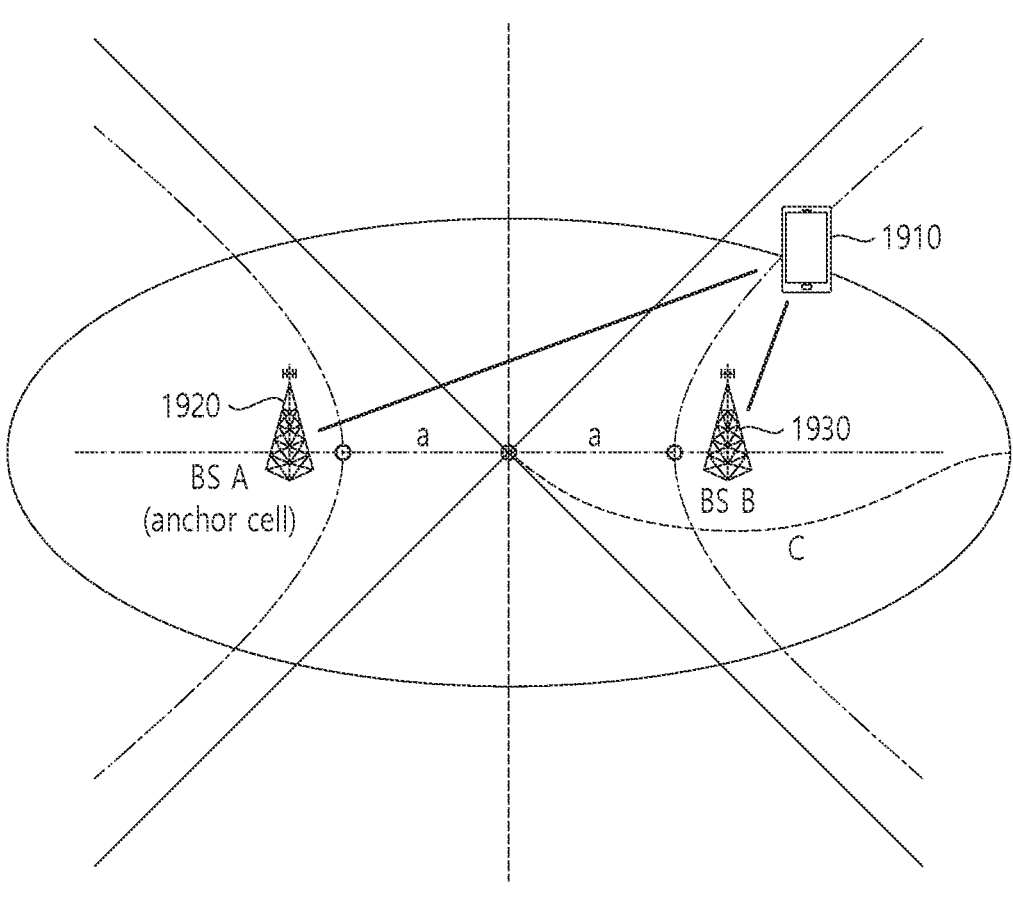
FIG. 19 is a drawing for explaining a method of measuring a location of a UE, according to an embodiment of the present disclosure.

FIG. 19 is a drawing for explaining a method in which a UE transmits and receives a signal for a location, according to an embodiment of the present disclosure. The embodiment of FIG. 19 may be combined with various embodiments of the present disclosure.

Referring to FIG. 19, according to an embodiment of the present disclosure, for example, a UE 1910 may obtain a location of the UE 1910, based on a geographical location of two anchor cells (or anchor nodes) or BSs (e.g., BS A 1920, BS B 1930), a result obtained when the UE 1910 or each BS (e.g., BS A 1920, BS B 1930) measures a TOA of a signal received from each BS (e.g., BS A 1920, BS B 1930), or a result of measuring a TOF. For example, the signal may include a positioning reference signal. For example, the UE may use an autonomous gap or a measurement gap received by requesting each BS to measure a reference signal time sum (RSTS) and/or a reference signal time difference (RSTD). For example, the UE may measure the TOA for each of the BS A and the BS B. For example, the UE may calculate the RSTD for the BS A-BS B, based on two TOAs and a transmission time offset (i.e., real time differences (RTDs)) of the BS A and the BS B. For example, the UE may calculate the RSTS for the BS A-BS B, based on two TOAs and a transmission time offset (i.e., RTDs) of the BS A and the BS B. For example, the UE may determine a geometric hyperbola, based on the RSTD. For example, the geometric hyperbola of which a difference between both distances is constant to be 2a may be determined based on the RSTD. For example, the UE may determine a geometric ellipse, based on the RSTD. For example, the UE may determine a geometric hyperbola of which a sum of both distances is constant to be 2c. For example, the UE may estimate a point at which the geometric hyperbola and the hyperbola intersect as the location of the UE. For example, the estimated location of the UE may be obtained as a specific range based on uncertainty of the measurement of the TOA.

For example, information on the location of the UE may be obtained based on the intersection of part of the hyperbola and part of the ellipse. For example, when there are multiple intersections of the hyperbola and the ellipse, any one of the multiple intersections may be selected by comparing the distance between the UE and an AN1 and the distance between the UE and an AN2. For example, when there are multiple intersections of the hyperbola and the ellipse, any one of the multiple intersections may be selected by comparing a distance and/or direction between the UE and the AN1, obtained based on a first TOF of the first PRS or a first time point at which the first PRS is received, and a distance and/or direction between the UE and the AN2, obtained based on a second TOF of the second PRS or a second time point at which the second PRS is received. For example, when there are multiple intersections of the hyperbola and the ellipse, any one of the multiple intersections may be selected based on information on the first PRS and/or information on the second PRS. For example, when there are multiple intersections of the hyperbola and the ellipse, any one of the multiple intersections may be selected based on information on a direction and/or strength of receiving the first PRS, and/or information on a direction and/or strength of receiving the second PRS.

Therefore, according to an embodiment of the present disclosure, for example, even if the UE is not present within the coverage of the BS C, the UE may calculate the RSTD for the BS A-BS C and the RSTS for the BS A-BS B. For example, even if the UE is not present within the coverage of the BS C, the UE may accurately estimate the location of the UE, based on the RSTD for the BS A-BS B and the RSTS for the BS A-BS B. For example, even if the UE is not present within the coverage of the BS C, since there is no need to calculate the RSTD for the BS B-BS C and the RSTD for the BS C-BS-A, an error of the UE location estimated based on the RSTD for the BS A-BS B and the RSTS for the BS A-BS B may be further decreased. For example, a UE having a single antenna system (i.e., a centralized antenna system (CAS)) may also perform positioning. For example, the UE may perform positioning without being based on three or more BSs. For example, the UE may perform positioning, based on only two BSs. For example, since the UE performs positioning based on the two BSs, coverage of positioning may be increased.

FIG. 20 is a drawing for explaining a procedure in which a UE transmits and receives a signal for a location, according to an embodiment of the present disclosure. The embodiment of FIG. 20 may be combined with various embodiments of the present disclosure.

Referring to FIG. 20, for example, the UE may select a synchronization reference. The synchronization reference may be at least any one of a GNSS, a BS, and a UE. For example, the UE may obtain synchronization based on a synchronization signal received from the synchronization reference (S1610). For example, the UE may receive a first PRS from a first BS (or anchor node, AN1) (S1620). For example, the UE may transmit the first PRS to the first BS (or anchor node, AN1). For example, the UE may transmit a second PRS to a second BS (or anchor node, AN2) (S1622). For example, the UE may receive the second PRS from the second BS (or anchor node, AN2). For example, the UE may measure a first TOF of the first PRS and/or a first time point at which the first PRS is received (S1630). For example, the AN1 may measure the first TOF of the first PRS and/or the first time point at which the first PRS is received. For example, the AN2 may measure a second TOF of the second PRS or a second time point at which the second PRS is received (S1632). For example, the UE may receive, from the AN2, information on the second TOF of the second PRS or the second time point at which the second PRS is received (S1634). For example, the UE may measure the second TOF of the second PRS and/or the second time point at which the second PRS is received. For example, the UE may obtain information on a sum of a first distance between the first device and the second device and a second distance between the first device and a third device, based on the first TOF of the first PRS and/or the first time point at which the first PRS is received and the second TOF of the second PRS or the second time point at which the second PRS is received (S1640). For example, the UE may receive, from the AN1 and/or the AN2, information on the sum of the first distance between the first device and the second device and the second distance between the first device and the third device. For example, the UE may obtain an ellipse of which a focus is a location of the AN1 and a location of the AN2, based on the information on the sum of the first distance and the second distance (S1660). For example, the UE may obtain a hyperbola of which a focus is the location of the AN1 and the location of the AN2, based on information on a difference between the first distance and the second distance (S1670). For example, the UE may obtain information on the location of the first device, based on the hyperbola and the ellipse (S1680). For example, the UE may obtain information on the location of the first device, based on an intersection between the hyperbola and the ellipse.

According to an embodiment of the present disclosure, a UE which uses a single antenna (i.e., a centralized antenna system (CAS)) may also perform positioning, based on two anchor nodes.

According to an embodiment of the present disclosure, for example, a UE may estimate a location of the UE through the following process, based on two anchor nodes, i.e., an AN1 and an AN2.

1) The AN1 and the AN2 may respectively transmit a PRS1 and a PRS2 to the UE.

2) The UE may measure a ToA difference (i.e., reference signal time difference (RSTD)) of the PRS1 and the PRS2.

3) The UE may calculate a hyperbola of which a focus is the location of the AN1 and the location of the AN2, based on the RSTD.

4) The UE may measure a sum (i.e., a reference signal time sum (RSTS)) of ToA or time of flight (ToF, i.e., signal transmission time) of each of the PRS1 and the PRS2.

5) The UE may calculate an ellipse of which a focus is the location of the AN1 and the location of the AN2, based on the RSTS.

6) The UE may estimate the location of the UE, based on the intersection of the hyperbola and the ellipse.

According to an embodiment of the present disclosure, for example, a UE may estimate a location of the UE through the following process, based on two anchor nodes, i.e., an AN1 and an AN2.

1) The AN1 and the AN2 may respectively transmit a PRS1 and a PRS2 to the UE.

2) The UE may measure a ToA difference (i.e., reference signal time difference (RSTD)) of the PRS1 and the PRS2.

3) The UE may measure a sum (i.e., a reference signal time sum (RSTS)) of ToA or time of flight (ToF, i.e., signal transmission time) of each of the PRS1 and the PRS2.

4) The UE may transmit the RSTD and the RSTS to a location server.

5) The location server may calculate a hyperbola of which a focus is the location of the AN1 and the location of the AN2, based on the RSTD.

6) The location server may calculate an ellipse of which a focus is the location of the AN1 and the location of the AN2, based on the RSTS.

7) The location server may estimate the location of the UE, based on the intersection of the hyperbola and the ellipse.

8) The location server may transmit the estimated UE location to the UE.

According to an embodiment of the present disclosure, for example, a UE may estimate a location of the UE through the following process, based on two anchor nodes. i.e., an AN1 and an AN2.

1) The UE may respectively transmit a PRS1 and a PRS2 to the AN1 and the AN2. For example, as an embodiment of the present disclosure, the PRS1 and the PRS2 may be the same PRS, and UE may transmit the single PRS to the AN1 and the AN2 at the same time.

2) The AN1 and the AN2 may transmit ToA or ToF of the PRS1 and PRS2 to a location server, and the location server may measure ToA difference (i.e., RSTD) of the PRS1 and PRS2.

3) The location server may measure a sum (i.e., a reference signal time sum (RSTS)) of ToA or time of flight (ToF) of each of the PRS1 and the PRS2.

4) The location server may calculate a hyperbola of which a focus is the location of the AN1 and the location of the AN2, based on the RSTD.

5) The location server may calculate an ellipse of which a focus is the location of the AN1 and the location of the AN2, based on the RSTS.

6) The location server may estimate the location of the UE, based on the intersection of the hyperbola and the ellipse.

7) The location server may transmit the estimated UE location to the UE.

According to an embodiment of the present disclosure, for example, a UE may estimate a location of the UE through the following process, based on two anchor nodes, i.e., an AN1 and an AN2.

1) The AN1 may transmit a PRS1 to the UE, and the UE may transmit a PRS2 to the AN2. For example, as an embodiment of the present disclosure, after the UE receives the PRS1, the UE may transmit the PRS2 at a time point later than a specific set value.

2) The UE may measure ToA or ToF of the PRS1.

3) The AN2 may measure ToA or ToF of the PRS2.

4) The AN2 may transmit the ToA or ToF of the PRS2, measured by the AN2, to the UE.

5) The UE may calculate a difference (i.e., a reference signal time difference (RSTD)) between the measured ToA or ToF value of the PRS1 and the ToA or ToF value of the PRS2 received from the AN2, measured by the AN2.

6) The UE may calculate a hyperbola of which a focus is the location of the AN1 and the location of the AN2, based on the RSTD.

7) The UE may calculate a sum (i.e., a reference signal time sum (RSTS)) of the measured ToA or ToF value of the PRS1 and the ToA or ToF value of the PRS2 received from the AN2, measured by the AN2. For example, as an embodiment of the present disclosure, the UE may transmit the ToA of the PRS1 to the AN2. For example, the AN2 may estimate the RSTS, based on the ToA of the PRS2 received by the AN2, the ToA or ToF measurement value of the PRS2, and/or the specific set value consumed until the UE receives the PRS1 and transmits the PRS2. For example, the AN2 may transmit the RSTS value to the UE.

8) The UE may calculate an ellipse of which a focus is the location of the AN1 and the location of the AN2, based on the RSTS.

9) The UE may estimate the location of the UE, based on the intersection of the hyperbola and the ellipse.

According to an embodiment of the present disclosure, for example, a UE may estimate a location of the UE through the following process, based on two anchor nodes, i.e., an AN1 and an AN2.

1) The AN1 may transmit a PRS1 to the UE, and the UE may transmit a PRS2 to the AN2. For example, as an embodiment of the present disclosure, the UE may transmit the PRS2 at a time point later than a specific set value after receiving the PRS1.

2) The UE may measure ToA or ToF of the PRS1, and may transmit the ToA or ToF of the PRS1 to a location server.

3) The AN2 may measure ToA or ToF of the PRS2, and may transmit the ToA or ToF of the PRS2 to the location server.

4) The location server may calculate a difference (i.e., a reference signal time difference (RSTD)) between the measured ToA or ToF value of the PRS1 received from the UE and the ToA or ToF value of the PRS2 received from the AN2, measured by the AN2.

5) The location server may calculate a hyperbola of which a focus is the location of the AN1 and the location of the AN2, based on the RSTD.

6) The location server may calculate a sum (i.e., a reference signal time sum (RSTS)) of the measured ToA or ToF value of the PRS1 received from the UE and the ToA or ToF value of the PRS2 received from the AN2, measured by the AN2. For example, as an embodiment of the present disclosure, the UE may transmit the ToA of the PRS1 to the AN2. For example, the AN2 may estimate the RSTS, based on the ToA of the PRS2 received by the AN2, the ToA or ToF measurement value of the PRS2, and/or the specific set value consumed until the UE receives the PRS1 and transmits the PRS2. For example, the AN2 may transmit the RSTS value to the location server.

7) The location server may calculate an ellipse of which a focus is the location of the AN1 and the location of the AN2, based on the RSTS.

8) The location server may estimate the location of the UE, based on the intersection of the hyperbola and the ellipse.

9) The location server may transmit the estimated UE location to the UE.

According to an embodiment of the present disclosure, for example, a UE may estimate a location of the UE through the following process, based on two anchor nodes, i.e., an AN1 and an AN2.

1) The UE may transmit a PRS1 to the AN1, and the AN2 may transmit a PRS2 to the UE. For example, as an embodiment of the present disclosure, the AN2 may transmit the PRS2 at a time point later than a specific set value after the AN1 receives the PRS1.

2) The AN1 may measure ToA or ToF of the PRS1, and the AN1 may transmit the ToA or ToF to the UE.

3) The UE may measure ToA or ToF of the PRS2.

4) The UE may calculate a difference (i.e., a reference signal time difference (RSTD)) between the measured ToA or ToF value of the PRS1 received from the AN1 and the ToA or ToF value of the PRS2 received from the AN2.

5) The UE may calculate a hyperbola of which a focus is the location of the AN1 and the location of the AN2, based on the RSTD.

6) The UE may calculate a sum (i.e., a reference signal time sum (RSTS)) of the ToA or ToF value of the PRS1 received from the AN1, and the ToA or ToF value of the PRS2 received from the AN2. For example, as an embodiment of the present disclosure, the UE may calculate the RSTS, based on a time point of transmitting the PRS1 to the AN1, the specific set value consumed until the AN1 receives the PRS1 and the AN2 transmits the PRS2, and/or the ToA or ToF value of the PRS2 received by the AN1 from the AN2.

7) The UE may calculate an ellipse of which a focus is the location of the AN1 and the location of the AN2, based on the RSTS.

8) The UE may estimate the location of the UE, based on the intersection of the hyperbola and the ellipse.

According to an embodiment of the present disclosure, for example, a UE may estimate a location of the UE through the following process, based on two anchor nodes, i.e., an AN1 and an AN2.

1) The UE may transmit a PRS1 to the AN1, and the AN2 may transmit a PRS2 to the UE. For example, as an embodiment of the present disclosure, the AN2 may transmit the PRS2 at a time point later than a specific set value after the AN1 receives the PRS1.

2) The AN1 may measure ToA or ToF of the PRS1, and may transmit the ToA or ToF of the PRS1 to a location server.

3) The UE may measure ToA or ToF of the PRS2, and may transmit the ToA or ToF of the PRS2 to the location server. For example, as an embodiment of the present disclosure, the UE may additionally transmit a transmission time point of the PRS2 to the location server.

4) The location server may calculate a difference (i.e., a reference signal time difference (RSTD)) between the measured ToA or ToF value of the PRS1 received from the AN1, and the ToA or ToF value of the PRS2 received from the UE.

5) The location server may calculate a hyperbola of which a focus is the location of the AN1 and the location of the AN2, based on the RSTD.

6) The location server may calculate a sum (i.e., a reference signal time sum (RSTS)) of the measured ToA or ToF value of the PRS1 received from the AN1, and the ToA or ToF value of the PRS2 received from the UE. For example, as an embodiment of the present disclosure, the location server may calculate the RSTS based on a time point at which the UE transmits the PRS1, received from the UE, a specific set value consumed until the AN1 receives the PRS1 and the AN2 transmits the PRS2, and/or the ToA or ToF value of the PRS2 received from the UE.

7) The location server may calculate an ellipse of which a focus is the location of the AN1 and the location of the AN2, based on the RSTS.

8) The location server may estimate the location of the UE, based on the intersection of the hyperbola and the ellipse.

9) The location server may transmit the estimated UE location to the UE.

An embodiment of the present disclosure may have various effects. For example, a UE having a single antenna system (i.e., a centralized antenna system (CAS)) may also perform positioning. For example, the UE may perform positioning without being based on three or more BSs. For example, the UE may perform positioning without being based one geographical information of the BS, additional measurement/report of the UE, and/or a network radio resource or the like. For example, the UE may perform positioning, based on only two BSs. For example, since the UE performs positioning based on the two BSs, a positioning error may be decreased. For example, since the UE performs positioning based on the two BSs, coverage of positioning may be increased.

FIG. 21 is a drawing for explaining a method in which a first device performs wireless communication, according to an embodiment of the present disclosure. The embodiment of FIG. 21 may be combined with various embodiments of the present disclosure.

Referring to FIG. 21, in step S2110, the first device may select a synchronization reference. For example, the synchronization reference may be at least any one of a GNSS, a BS, and a UE. In step S2120, the first device may obtain synchronization based on a synchronization signal received from the synchronization reference. In step S2130, the first device may receive a first PRS from a second device. In step S2140, the first device may transmit a second PRS to a third device. For example, in step S2140, the first device may transmit the second PRS to the second device and the third device at a time point added by a threshold from a first time point at which the first PRS is received. In step S2150, information on a sum of a first distance between the first device and the second device and a second distance between the first device and the third device may be obtained based on the first time point, a second time point at which the second PRS is received by the second device, and a third time point at which the second PRS is received by the third device. In step S2160, the first device may obtain information on a location of the first device, based on the information on the sum of the first distance and the second distance.

Additionally or alternatively, the synchronization signal may include a sidelink synchronization signal block (S-SSB), based on that the synchronization reference is the UE.

Additionally or alternatively, the S-SSB may include a sidelink primary synchronization signal (S-PSS), a sidelink secondary synchronization signal (S-SSS), and a physical sidelink broadcast channel (PSBCH).

Additionally or alternatively, the first device may obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the first device may obtain information related to GNSS-based synchronization or eNB/gNB-based synchronization.

Additionally or alternatively, the first device may obtain configuration information related to a PRS. The PRS may include a first PRS and/or a second PRS.

Additionally or alternatively, the first device may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

Additionally or alternatively, the first device may receive information on the second time point from the second device.

Additionally or alternatively, the first device may receive information on the third time point from the third device.

Additionally or alternatively, the first device may obtain information on the sum of the first distance and the second distance, based on the first time point, the second time point, and the threshold.

Additionally or alternatively, the first device may obtain information on a difference between the first distance and the second distance, based on the second time point and the third time point.

Additionally or alternatively, the first device may receive a difference value between a fourth time point, at which the first PRS is transmitted by the second device, and the second time point from the second device.

Additionally or alternatively, the first device may obtain the first distance, based on the difference value and the threshold.

Additionally or alternatively, the first device may obtain the information on the sum of the first distance and the second distance is obtained based on the first distance and the difference between the first distance and the second distance.

Additionally or alternatively, the first device may obtain information on a location of the second device and information on a location of the third device.

Additionally or alternatively, the first device may obtain information on an ellipse of which a focus is the location of the second device and the location of the third device and of which the sum of the first distance and the second distance is constant, based on the information on the sum of the first distance and the second distance.

Additionally or alternatively, the first device may obtain information on a hyperbola of which a focus is the location of the second device and the location of the third device and of which the sum of the first distance and the second distance is constant, based on the information on the difference between the first distance and the second distance.

Additionally or alternatively, the first device may obtain information on the location of the first device, based on information on a region in which the ellipse and the hyperbola intersect.

Additionally or alternatively, the first device may be a device in which a centralized antenna system is supported.

Additionally or alternatively, the threshold may be preset, or may be set by the first device.

Additionally or alternatively, the threshold may be equal to 0, or may be a value greater than 0.

The proposed method may be applied to an apparatus according to various embodiments of the present disclosure. First, the processor 102 of the first device 100 may select a synchronization reference. For example, the synchronization reference may be at least any one of a GNSS, a BS, and a UE. In addition, the processor 102 of the first device 100 may obtain synchronization based on a synchronization signal received from the synchronization reference. For example, the processor 102 of the first device 100 may control the transceiver 106 to receive a first PRS from a second device. For example, the processor 102 of the first device 100 may control the transceiver 106 to transmit a second PRS to the second device and a third device at a time point added by a threshold from a first time point at which the first PRS is received. For example, the processor 102 of the first device 100 may obtain information on a sum of a first distance between the first device and the second device and a second distance between the first device and the third device, based on the first time point, a second time point at which the second PRS is received by the second device, and a third time point at which the second PRS is received by the third device. For example, the processor 102 of the first device 100 may obtain information on a location of the first device, based on the information on the sum of the first distance and the second distance. Additionally or alternatively, the synchronization signal may include an S-SSB, based on that the synchronization reference is the UE. The S-SSB may include an S-PSS, an S-SSS, and a PSBCH. Additionally or alternatively, the processor 102 of the first device 100 may obtain configuration information related to a PRS. The PRS may include a first PRS and/or a second PRS. The configuration information related to the PRS may include at least one of information on a sequence of the PRS, information on a bandwidth of the PRS, and information on a frequency of the PRS.

Additionally or alternatively, the processor 102 of the first device 100 may obtain information related to GNSS-based synchronization or eNB/gNB-based synchronization.

Additionally or alternatively, the processor 102 of the first device 100 may obtain configuration information related to a PRS. The PRS may include a first PRS and/or a second PRS.

Additionally or alternatively, the processor 102 of the first device 100 may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, a first device performing wireless communication may be provided. The first device may include: one or more memories storing instructions; one or more transceivers; and one or more processors coupling the one or more memories and the one or more transceivers. The one or more processors may execute the instructions to: select a synchronization reference, wherein the synchronization reference is at least one of a GNSS, a BS, and a UE; obtain synchronization based on a synchronization signal received from the synchronization reference; and receive a first PRS from a second device. For example, the one or more processors may execute the instructions to transmit a second PRS to a first BS and a second BS at a time point added by a threshold from a first time point at which the first PRS is received. For example, the one or more processors may execute the instructions to obtain information on a sum of a first distance between the first UE and the first BS and a second distance between the first UE and a second BS, based on the first time point, a second time point at which the second PRS is received by the first BS, and a third time point at which the second PRS is received by the second BS. For example, the one or more processors may execute the instructions to obtain information on a location of the first UE, based on the information on the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the one or more processors may execute the instructions to obtain configuration information related to a PRS. The PRS may include a first PRS and/or a second PRS. The configuration information related to the PRS may include at least one of information on a sequence of the PRS, information on a bandwidth of the PRS, and information on a frequency of the PRS.

Additionally or alternatively, the one or more processors may execute the instructions to obtain information related to GNSS-based synchronization or eNB/gNB-based synchronization.

Additionally or alternatively, the one or more processors may execute the instructions to obtain configuration information related to a PRS. The PRS may include a first PRS and/or a second PRS.

Additionally or alternatively, the one or more processors may execute the instructions to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, an apparatus configured to control a first UE may be provided. The apparatus may include: one or more processors; and one or more memoires operatively coupled by means of the one or more processors and storing instructions. The one or more processors may execute the instructions to: select a synchronization reference, wherein the synchronization reference is at least one of a GNSS, a BS, and a UE; obtain synchronization based on a synchronization signal received from the synchronization reference; receive a first PRS from a first BS; and transmit a second PRS to the first BS and a second BS at a time point added by a threshold from a first time point at which the first PRS is received. For example, the one or more processors may execute the instructions to obtain information on a sum of a first distance between the first UE and the first BS and a second distance between the first UE and the second BS, based on the first time point, a second time point at which the second PRS is received by the first BS, and a third time point at which the second PRS is received by the second BS. For example, the one or more processors may execute the instructions to obtain information on a location of the first UE, based on the information on the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the one or more processors may execute the instructions to obtain configuration information related to a PRS. The PRS may include a first PRS and/or a second PRS. The configuration information related to the PRS may include at least one of information on a sequence of the PRS, information on a bandwidth of the PRS, and information on a frequency of the PRS.

Additionally or alternatively, the first UE may obtain information related to GNSS-based synchronization or eNB/gNB-based synchronization.

Additionally or alternatively, the first UE may obtain configuration information related to a PRS. The PRS may include a first PRS and/or a second PRS.

Additionally or alternatively, the first UE may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, a non-transitory computer-readable medium having instructions recorded thereon may be provided. The instructions, when executed by one or more processors, may cause the one or more processors to: cause a first device to select a synchronization reference, wherein the synchronization reference is at least one of a GNSS, a BS, and a UE; cause the first device to obtain synchronization based on a synchronization signal received from the synchronization reference; cause the first device to receive a first PRS from a second device; and cause the first device to transmit the second PRS to the second device and a third device at a time point added by a threshold from a first time point at which the first PRS is received. For example, the instructions, when executed by the one or more processors, may cause the first device to obtain information on a sum of a first distance between the first device and the second device and a second distance between the first device and the third device, based on the first time point, a second time point at which the second PRS is received by the second device, and a third time point at which the second PRS is received by the third device. For example, the instructions, when executed by the one or more processors, may cause the first device to obtain information on a location of the first device, based on the information on the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the instructions, when executed by one or more processors, may cause the one or more processors to cause the first device to obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the instructions, when executed by one or more processors, may cause the one or more processors to cause the first device to obtain information related to GNSS-based synchronization or eNB/gNB-based synchronization.

Additionally or alternatively, the instructions, when executed by one or more processors, may cause the one or more processors to cause the first device to obtain configuration information related to a PRS. The PRS may include a first PRS and/or a second PRS.

Additionally or alternatively, the instructions, when executed by one or more processors, may cause the one or more processors to cause the first device to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

Figure 22:
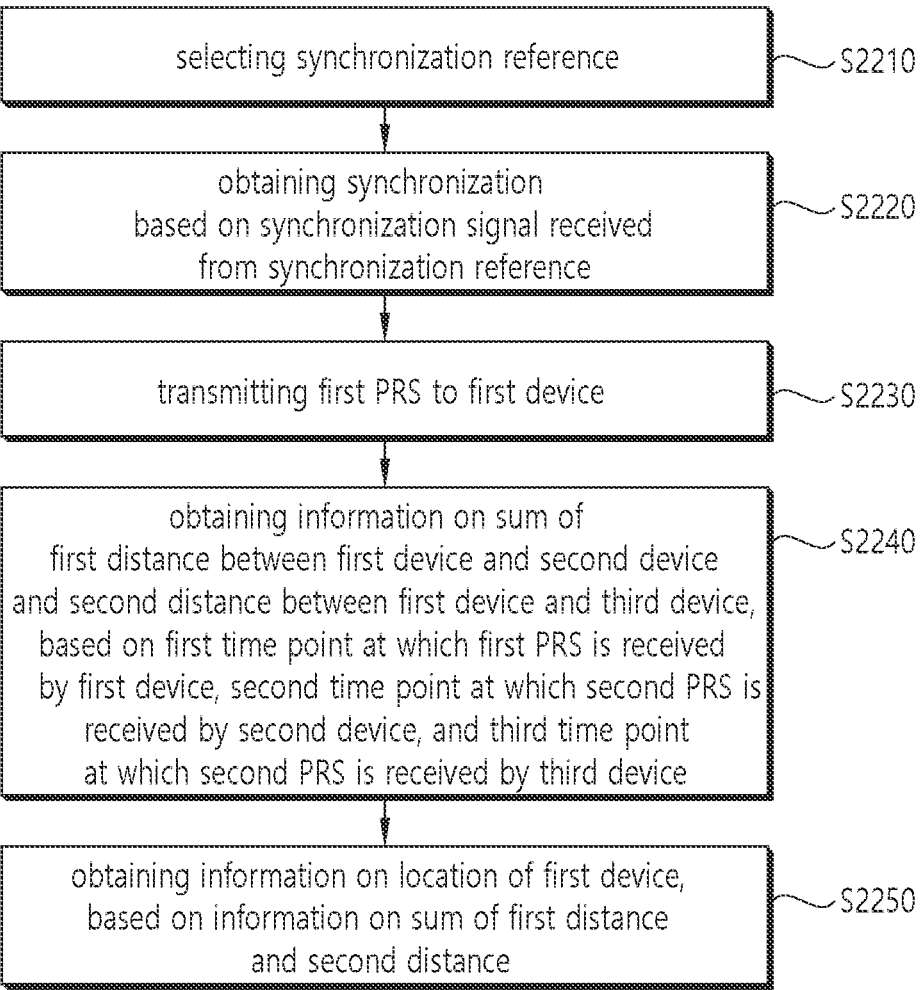
FIG. 22 shows a method for performing wireless communication by a second device, based on an embodiment of the present disclosure.

FIG. 22 is a drawing for explaining a method in which a second device performs wireless communication, according to an embodiment of the present disclosure. The embodiment of FIG. 22 may be combined with various embodiments of the present disclosure.

Referring to FIG. 22, in step S2210, the second device may select a synchronization reference. For example, the synchronization reference may be at least any one of a GNSS, a BS, and a UE. In step S2220, the second device may obtain synchronization based on a synchronization signal received from the synchronization reference. In step S2230, the second device may transmit a first PRS to a first device. In step S2240, the second device may obtain information on a sum of a first distance between the first device and the second device and a second distance between the first device and a third device, based on a first time point at which the first PRS is received by the first device, a second time point at which a second PRS is received by the second device, and a third time point at which the second PRS is received by the third device. In step S2250, the second device may obtain information on a location of the first device, based on the information on the sum of the first distance and the second distance.

The proposed method may be applied to an apparatus according to various embodiments of the present disclosure. First, the processor 202 of the second device 200 may select a synchronization reference. For example, the synchronization reference may be at least any one of a GNSS, a BS, and a UE. In addition, the processor 202 of the second device 200 may obtain synchronization based on a synchronization signal received from the synchronization reference. For example, the processor 202 of the second device 200 may control the transceiver 206 to transmit a first PRS to a first device. For example, the processor 202 of the second device 200 may obtain information on a sum of a first distance between the first UE and the first BS and a second distance between the first UE and a second BS, based on a first time point at which the first PRS is received by the first UE, a second time point at which a second PRS is received by the first BS, and a third time point at which the second PRS is received by the second BS. For example, the processor 202 of the second device 200 may obtain information on a location of the first UE, based on the information the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the second device may obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the second device may obtain information related to GNSS-based synchronization or eNB/gNB-based synchronization.

Additionally or alternatively, the second device may obtain configuration information related to a PRS. The PRS may include a first PRS and/or a second PRS.

Additionally or alternatively, the second device may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, a second device performing wireless communication may be provided. The second device may include: one or more memories storing instructions; one or more transceivers; and one or more processors coupling the one or more memories and the one or more transceivers. The one or more processors may execute the instructions to: select a synchronization reference, wherein the synchronization reference is at least one of a GNSS, a BS, and a UE; obtain synchronization based on a synchronization signal received from the synchronization reference; and transmit a first PRS to a first device. For example, the one or more processors may execute the instructions to obtain information on a sum of a first distance between the first device and the second device and a second distance between the first device and a third device, based on a first time point at which the first PRS is received by the first device, a second time point at which a second PRS is received by the second device, and a third time point at which the second PRS is received by the third device. For example, the one or more processors may execute the instructions to obtain information on a location of the first device, based on the information on the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the one or more processors may execute the instructions to obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the second device may obtain information related to GNSS-based synchronization or eNB/gNB-based synchronization.

Additionally or alternatively, the second device may obtain configuration information related to a PRS. The PRS may include a first PRS and/or a second PRS.

Additionally or alternatively, the second device may obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, an apparatus configured to control a first BS may be provided. The apparatus may include: one or more processors; and one or more memoires operatively coupled by means of the one or more processors and storing instructions. The one or more processors may execute the instructions to: select a synchronization reference, wherein the synchronization reference is at least one of a GNSS, a BS, and a UE; obtain synchronization based on a synchronization signal received from the synchronization reference; and transmit a first PRS to a first UE. For example, the one or more processors may execute the instructions to obtain information on a sum of a first distance between the first UE and the first BS and a second distance between the first UE and a second BS, based on a first time point at which the first PRS is received by the first UE, a second time point at which a second PRS is received by the first BS, and a third time point at which the second PRS is received by the second BS. For example, the one or more processors may execute the instructions to obtain information on a location of the first UE, based on the information the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the one or more processors may execute the instructions to obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the one or more processors may execute the instructions causing the first BS to obtain information related to GNSS-based synchronization or eNB/gNB-based synchronization.

Additionally or alternatively, the one or more processors may execute the instructions causing the first BS to obtain information related to GNSS-based synchronization or eNB/gNB-based synchronization.

Additionally or alternatively, the one or more processors may execute the instructions causing the first BS to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

According to an embodiment of the present disclosure, a non-transitory computer-readable medium having instructions recorded thereon may be provided. The instructions, when executed by one or more processors, may cause the one or more processors to: cause a second device to select a synchronization reference, wherein the synchronization reference is at least one of a GNSS, a BS, and a UE; cause the second device to obtain synchronization based on a synchronization signal received from the synchronization reference; and cause the second device to transmit a first PRS to a first device. For example, the instructions, when executed by the one or more processors, may cause the one or more processors to: obtain information on a sum of a first distance between the first device and the second device and a second distance between the first device and a third device, based on a first time point at which the first PRS is received by the first device, a second time point at which a second PRS is received by the second device, and a third time point at which the second PRS is received by the third device. For example, the instructions, when executed by the one or more processors, may cause the one or more processors to: cause the second device to obtain information on a location of the first device, based on the information on the sum of the first distance and the second distance.

Additionally or alternatively, the synchronization signal may include an S-SSB, based on that the synchronization reference is the UE.

Additionally or alternatively, the S-SSB may include an S-PSS, an S-SSS, and a PSBCH.

Additionally or alternatively, the instructions, when executed by one or more processors, may cause the one or more processors to cause the second device to obtain configuration information related to a PRS.

The PRS may include a first PRS and/or a second PRS.

The configuration information related to the PRS may include at least one of information on a sequence of the PRS, information on a bandwidth of the PRS, and information on a frequency of the PRS.

Additionally or alternatively, the instructions, when executed by one or more processors, may cause the one or more processors to cause the second device to obtain information related to GNSS-based synchronization or eNB/gNB-based synchronization.

Additionally or alternatively, the instructions, when executed by one or more processors, may cause the one or more processors to cause the second device to obtain configuration information related to a PRS. The PRS may include a first PRS and/or a second PRS.

Additionally or alternatively, the instructions, when executed by one or more processors, may cause the one or more processors to cause the second device to obtain information related to a resource for transmission of the PRS or information related to a resource for reception of the PRS. The resource for transmission of the PRS or the resource for reception of the PRS may include a time resource and/or a frequency resource. The information related to the resource for transmission of the PRS may include information related to a UL resource. The information related to the resource for reception of the PRS may include information related to a DL resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
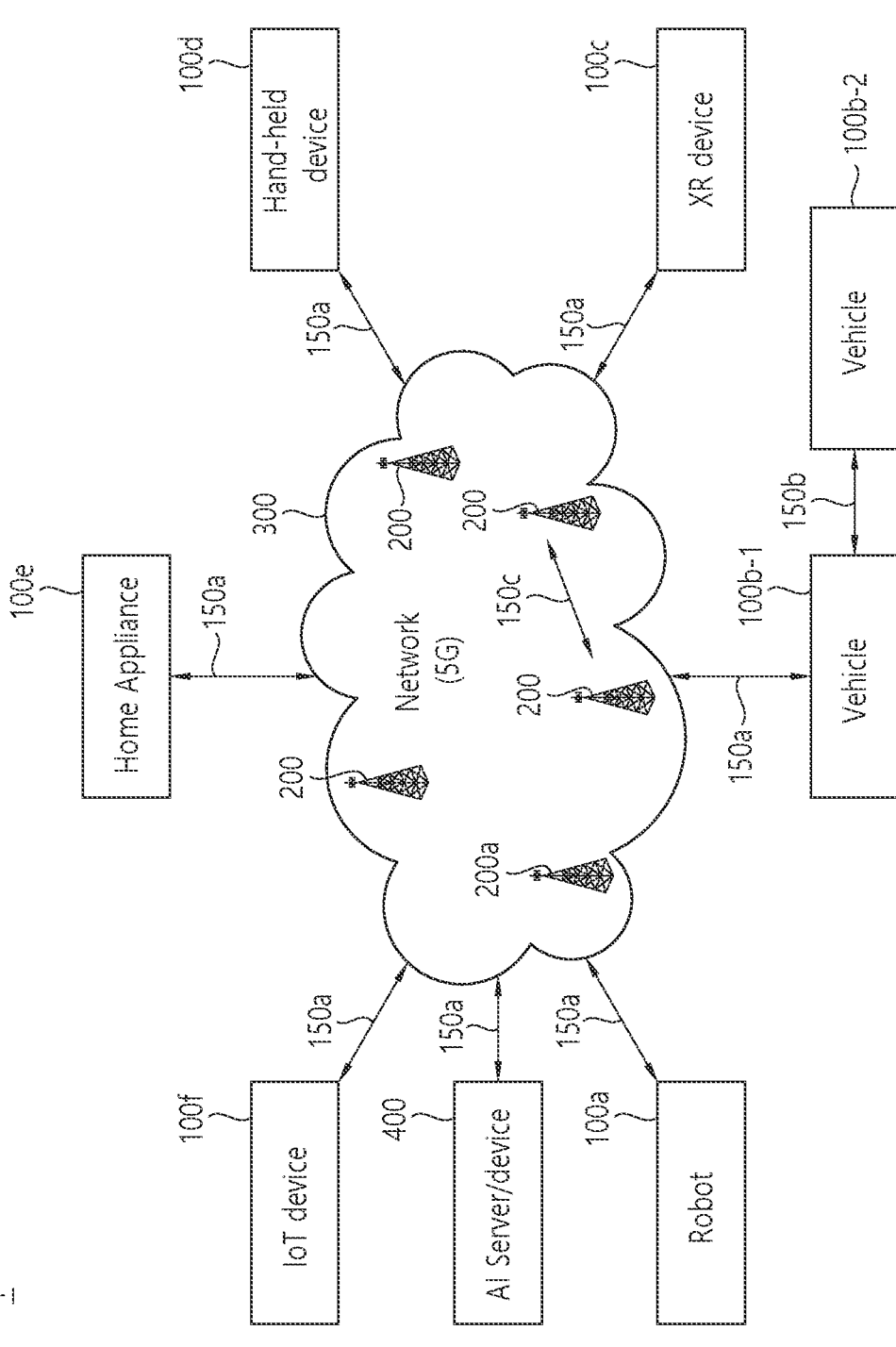
FIG. 23 shows a communication system 1, based on an embodiment of the present disclosure.

FIG. 23 shows a communication system 1, based on an embodiment of the present disclosure. The embodiment of FIG. 23 may be combined with various embodiments of the present disclosure.

Referring to FIG. 23, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 24:
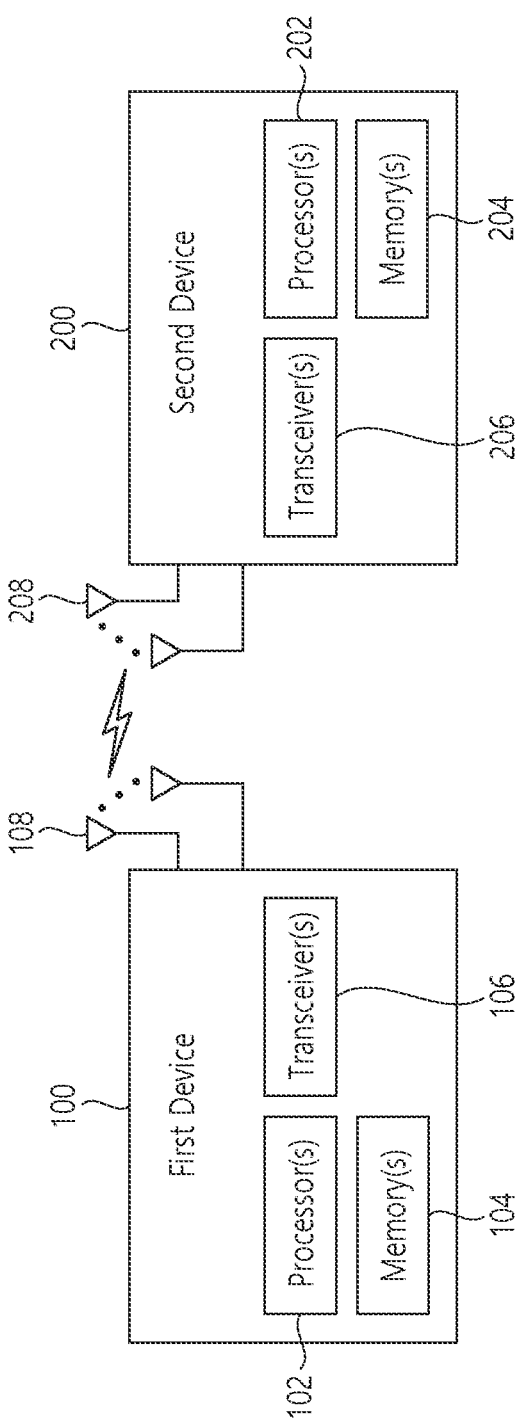
FIG. 24 shows wireless devices, based on an embodiment of the present disclosure.

FIG. 24 shows wireless devices, based on an embodiment of the present disclosure. The embodiment of FIG. 24 may be combined with various embodiments of the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and at least one memory 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and at least one memory 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP. RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 25:
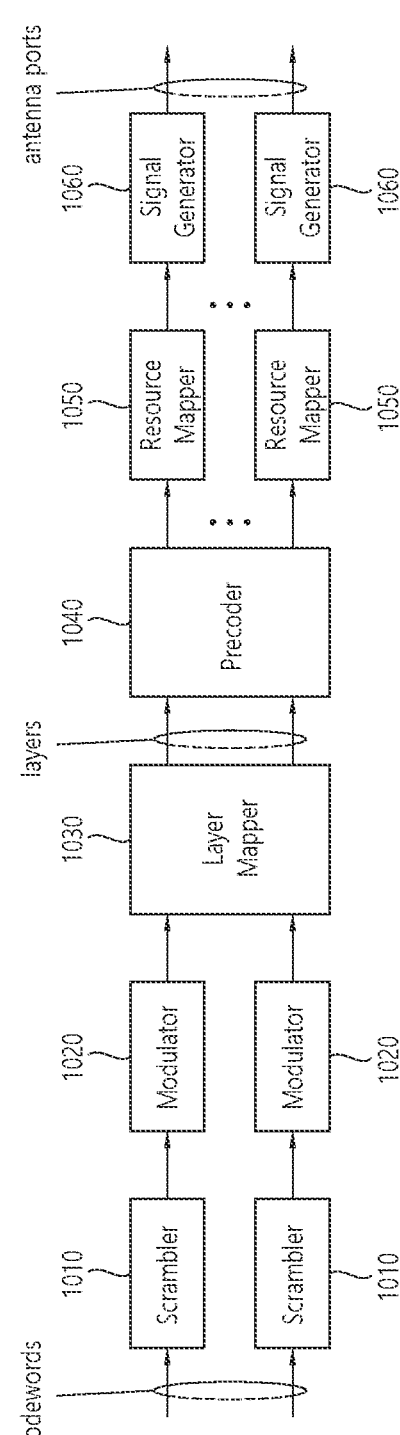
FIG. 25 shows a signal process circuit for a transmission signal, based on an embodiment of the present disclosure.

FIG. 25 shows a signal process circuit for a transmission signal, based on an embodiment of the present disclosure. The embodiment of FIG. 25 may be combined with various embodiments of the present disclosure.

Referring to FIG. 25, a signal processing circuit 1000 may include scramblers 1010, modulators 1020, a layer mapper 1030, a precoder 1040, resource mappers 1050, and signal generators 1060. An operation/function of FIG. 25 may be performed, without being limited to, the processors 102 and 202 and/or the transceivers 106 and 206 of FIG. 24. Hardware elements of FIG. 25 may be implemented by the processors 102 and 202 and/or the transceivers 106 and 206 of FIG. 24. For example, blocks 1010 to 1060 may be implemented by the processors 102 and 202 of FIG. 24. Alternatively, the blocks 1010 to 1050 may be implemented by the processors 102 and 202 of FIG. 24 and the block 1060 may be implemented by the transceivers 106 and 206 of FIG. 24.

Codewords may be converted into radio signals via the signal processing circuit 1000 of FIG. 25. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 25. For example, the wireless devices (e.g., 100 and 200 of FIG. 24) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 26 shows another example of a wireless device, based on an embodiment of the present disclosure. The wireless device may be implemented in various forms according to a use-case/service (refer to FIG. 23). The embodiment of FIG. 26 may be combined with various embodiments of the present disclosure.

Referring to FIG. 26, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O)) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
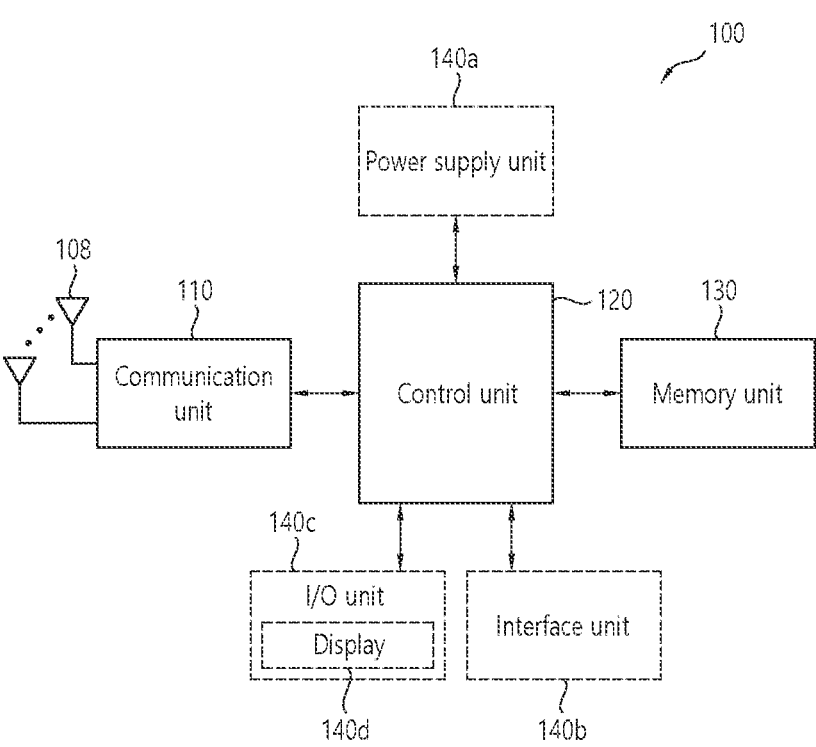
FIG. 27 shows a hand-held device, based on an embodiment of the present disclosure.

FIG. 27 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 27 may be combined with various embodiments of the present disclosure.

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O) port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 28 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 28 may be combined with various embodiments of the present disclosure.

Referring to FIG. 28, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140$b$ may supply power to the vehicle or the autonomous vehicle 100 and include a wired/wireless charging circuit, a battery, etc. The sensor unit 140$c$ may acquire a vehicle state, ambient environment information, user information, etc. The sensor unit 140$c$ may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140$d$ may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140$d$ may generate an autonomous driving path and a driving plan from the obtained data. The control unit 120 may control the driving unit 140$a$ such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140$c$ may obtain a vehicle state and/or surrounding environment information. The autonomous driving unit 140$d$ may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method in which a first device performs wireless communication, the method comprising:
obtaining information related to global navigation satellite system (GNSS)-based synchronization or eNB/gNB-based synchronization;
selecting a synchronization reference, wherein the synchronization reference is at least one of the GNSS, a base station (BS), and a user equipment (UE);
obtaining synchronization based on a synchronization signal received from the synchronization reference;
obtaining configuration information related to a positioning reference signal (PRS), wherein the PRS includes a first PRS and/or a second PRS;
obtaining information related to a resource for transmission of the PRS or information related to a resource for reception of the PRS,
wherein the resource for transmission of the PRS or the resource for reception of the PRS includes a time resource and/or a frequency resource,
wherein the information related to the resource for transmission of the PRS includes information related to an uplink (UL) resource, and
wherein the information related to the resource for reception of the PRS includes information related to a downlink (DL) resource;
receiving the first PRS from a second device;
transmitting the second PRS to the second device and a third device at a time point added by a threshold from a first time point at which the first PRS is received;
obtaining information on a sum of a first distance between the first device and the second device and a second distance between the first device and the third device, based on the first time point, a second time point at which the second PRS is received by the second device, and a third time point at which the second PRS is received by the third device; and
obtaining information on a location of the first device, based on the information on the sum of the first distance and the second distance.

2. The method of claim 1, further comprising:
receiving information on the second time point from the second device; and
receiving information on the third time point from the third device.

3. The method of claim 1, wherein the information on the sum of the first distance and the second distance is obtained based on the first time point, the second time point, and the threshold.

4. The method of claim 1, further comprising obtaining information on a difference between the first distance and the second distance, based on the second time point and the third time point.

5. The method of claim 1, further comprising:
receiving a difference value between a fourth time point, at which the first PRS is transmitted by the second device, and the second time point from the second device; and
obtaining the first distance, based on the difference value and the threshold.

6. The method of claim 5, wherein the information on the sum of the first distance and the second distance is obtained based on the first distance and the difference between the first distance and the second distance.

7. The method of claim 1, further comprising obtaining information on a location of the second device and information on a location of the third device.

8. The method of claim 7, further comprising obtaining information on an ellipse of which a focus is the location of the second device and the location of the third device and of which the sum of the first distance and the second distance is constant, based on the information on the sum of the first distance and the second distance.

9. The method of claim 8, further comprising obtaining information on a hyperbola of which a focus is the location of the second device and the location of the third device and of which the sum of the first distance and the second distance is constant, based on the information on the difference between the first distance and the second distance.

10. The method of claim 9, wherein information on the location of the first device is obtained based on information on a region in which the ellipse and the hyperbola intersect.

11. The method of claim 1, wherein the first device is a device in which a centralized antenna system is supported.

12. The method of claim 1, wherein the threshold is pre-set, or is set by the first device and is greater than 0.

13. A first device performing wireless communication, comprising:

one or more memories storing instructions;

one or more transceivers; and one or more processors coupling the one or more memories and the one or more transceivers, wherein the one or more processors execute the instructions to:

obtain information related to global navigation satellite system (GNSS)-based synchronization or eNB/gNB-based synchronization;

select a synchronization reference, wherein the synchronization reference is at least one of the GNSS, a base station (BS), and a user equipment (UE);

obtain synchronization based on a synchronization signal received from the synchronization reference;

obtain configuration information related to a positioning reference signal (PRS), wherein the PRS includes a first PRS and/or a second PRS;

obtain information related to a resource for transmission of the PRS or information related to a resource for reception of the PRS, wherein the resource for transmission of the PRS or the resource for reception of the PRS includes a time resource and/or a frequency resource, wherein the information related to the resource for transmission of the PRS includes information related to an uplink (UL) resource, and wherein the information related to the resource for reception of the PRS includes information related to a downlink (DL) resource;

receive the first PRS from a second device;

transmit the second PRS to the second device and a third device at a time point added by a threshold from a first time point at which the first PRS is received;

obtain information on a sum of a first distance between the first device and the second device and a second distance between the first device and the third device, based on the first time point, a second time point at which the second PRS is received by the second device, and a third time point at which the second PRS is received by the third device; and obtain information on a location of the first device, based on the information on the sum of the first distance and the second distance.

14. The first device of claim 13, the instructions further comprising:

receiving information on the second time point from the second device; and receiving information on the third time point from the third device.

15. The first device of claim 13, wherein the information on the sum of the first distance and the second distance is obtained based on the first time point, the second time point, and the threshold.

16. The first device of claim 13, the instructions further comprising: obtaining information on a difference between the first distance and the second distance, based on the second time point and the third time point.

17. The first device of claim 13, the instructions further comprising:

receiving a difference value between a fourth time point, at which the first PRS is transmitted by the second device, and the second time point from the second device; and obtaining the first distance, based on the difference value and the threshold.

18. The first device of claim 17, wherein the information on the sum of the first distance and the second distance is obtained based on the first distance and the difference between the first distance and the second distance.

19. The first device of claim 13, the instructions further comprising: obtaining information on a location of the second device and information on a location of the third device.

20. An apparatus configured to control a first user equipment (UE), the apparatus comprising:

one or more processors; and one or more memoires operatively coupled by means of the one or more processors and storing instructions, wherein the one or more processors execute the instructions to:

obtain information related to global navigation satellite system (GNSS)-based synchronization or eNB/gNB-based synchronization;

select a synchronization reference, wherein the synchronization reference is at least one of the GNSS, a base station (BS), and a UE;

obtain synchronization based on a synchronization signal received from the synchronization reference;

obtain configuration information related to a positioning reference signal (PRS), wherein the PRS includes a first PRS and/or a second PRS;

obtain information related to a resource for transmission of the PRS or information related to a resource for reception of the PRS, wherein the resource for transmission of the PRS or the resource for reception of the PRS includes a time resource and/or a frequency resource, wherein the information related to the resource for transmission of the PRS includes information related to an uplink (UL) resource, and wherein the information related to the resource for reception of the PRS includes information related to a downlink (DL) resource;

receive the first PRS from a first BS;

transmit the second PRS to the first BS and a second BS at a time point added by a threshold from a first time point at which the first PRS is received;

obtain information on a sum of a first distance between the first UE and the first BS and a second distance between the first UE and the second BS, based on the first time point, a second time point at which the second PRS is received by the first BS, and a third time point at which the second PRS is received by the second BS; and obtain information on a location of the first UE, based on the information on the sum of the first distance and the second distance.

* * * * *